United States Patent
Ye et al.

(10) Patent No.: US 11,956,169 B2
(45) Date of Patent: Apr. 9, 2024

(54) ANCHOR CHANNEL DESIGN FOR UNLICENSED INTERNET OF THINGS (IOT)

(71) Applicant: APPLE INC., Cupertino, CA (US)

(72) Inventors: Qiaoyang Ye, San Jose, CA (US);
Huaning Niu, San Jose, CA (US);
Wenting Chang, Beijing (CN);
Salvatore Talarico, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 113 days.

(21) Appl. No.: 17/444,022

(22) Filed: Jul. 29, 2021

(65) Prior Publication Data

US 2021/0359815 A1     Nov. 18, 2021

Related U.S. Application Data

(62) Division of application No. 16/496,375, filed as application No. PCT/US2018/027368 on Apr. 12, 2018, now Pat. No. 11,095,409.

(Continued)

(51) Int. Cl.
*H04W 16/14*    (2009.01)
*H04L 5/00*     (2006.01)
(Continued)

(52) U.S. Cl.
CPC .......... *H04L 5/0048* (2013.01); *H04L 5/0012* (2013.01); *H04W 4/70* (2018.02);
(Continued)

(58) Field of Classification Search
CPC ...... H04L 5/0048; H04L 5/0012; H04W 4/70; H04W 16/14; H04W 48/10; H04W 74/0808
See application file for complete search history.

(56) References Cited

U.S. PATENT DOCUMENTS 10,652,844 B1 *   5/2020  De la Broise ........ H04L 1/1678
2016/0295355 A1 * 10/2016  Yuan ..................... H04W 36/06
(Continued)

FOREIGN PATENT DOCUMENTS

WO    2017059184 A1    4/2017
WO    2018191538 A1   10/2018

OTHER PUBLICATIONS

PCT/US2018/027368, International Search Report and Written Opinion, dated Jul. 13, 2018, 12 pages.
(Continued)

*Primary Examiner* — Dai Phuong
(74) *Attorney, Agent, or Firm* — Dorsey & Whitney LLP

(57) ABSTRACT

Technology for a Next Generation NodeB (gNB) operable to communicate over an anchor channel for Unlicensed Internet of Things (U-IoT) is disclosed. The gNB can encode control information for transmission on two discovery reference signal (DRS) subframes to a user equipment (UE). The control information can be transmitted on an anchor channel having a set frequency for U-IoT in an adaptive frequency hopping system. The control information can include: a primary synchronization signal (PSS), a secondary synchronization signal (SSS), a physical broadcast channel (PBCH) transmission, and a system information block for MulteFire bandwidth reduced (SIB-MF-BR).

13 Claims, 31 Drawing Sheets

Related U.S. Application Data

(60) Provisional application No. 62/526,208, filed on Jun. 28, 2017, provisional application No. 62/487,306, filed on Apr. 19, 2017, provisional application No. 62/484,748, filed on Apr. 12, 2017.

(51) Int. Cl.
  *H04W 4/70* (2018.01)
  *H04W 48/10* (2009.01)
  *H04W 74/0808* (2024.01)

(52) U.S. Cl.
  CPC ........... *H04W 16/14* (2013.01); *H04W 48/10* (2013.01); *H04W 74/0808* (2013.01)

(56) References Cited

U.S. PATENT DOCUMENTS

| | | | |
|---|---|---|---|
| 2017/0094621 A1* | 3/2017 | Xu | H04W 72/23 |
| 2017/0208592 A1* | 7/2017 | Rico Alvarino | H04L 5/0048 |
| 2017/0325049 A1* | 11/2017 | Basu Mallick | H04W 48/12 |
| 2017/0332325 A1* | 11/2017 | Nan | H04W 24/02 |
| 2017/0359737 A1 | 12/2017 | Singh et al. | |
| 2018/0123859 A1* | 5/2018 | Liu | H04L 5/0048 |
| 2019/0052308 A1 | 2/2019 | Niu et al. | |
| 2019/0089485 A1 | 3/2019 | Yun et al. | |
| 2019/0394706 A1 | 12/2019 | Phan et al. | |
| 2020/0045618 A1 | 2/2020 | Chang et al. | |
| 2021/0058206 A1 | 2/2021 | Ye et al. | |

OTHER PUBLICATIONS

MulteFire Alliance, "MulteFire Release 1.0 Technical Paper, A New Way to Wireless", https://www.multefire.org/wp-content/uploads/MulteFire-Release-1.0-whitepaper_FINAL.pdf, Jan. 20, 2017, 25 pages.

Mediatek Inc., "Discussion on NB-PDSCH", R1-160153, 3GPP TSG RAN WG1 NB-IoT Ad-Hoc Meeting, Budapest, Hungary, Agenda Item 2.1.1.3, Jan. 18-20, 2016, 4 pages.

Huawei, HiSilicon, "On multi-PRB operation", R1-161039, 3GPP TSG RAN WG1 Meeting #84, St Julian's, Malta, Agenda Item 7.2.1.3, Feb. 15-19, 2016, 3 pages.

Qualcomm, "MulteFire Technology Progress and Benefits, and How It Enables A New Breed of Neutral Hosts", https://www.qualcomm.com/media/documents/files/multefire-technology.pdf, May 24, 2016, 26 pages.

U.S. Appl. No. 16/496,375, Notice of Allowance, dated Apr. 20, 2021, 9 pages.

* cited by examiner

Example 1 | PSS + SSS + PBCH | PSS + SSS + MPDCCH

Example 2 | PSS + SSS + PBCH | MPDCCH

Example 3 | PSS + SSS + PBCH + MPDCCH

Example 4 | PSS + SSS + PBCH | PBCH + MPDCCH

Example 5 | PSS + SSS + PBCH + PDSCH of paging or SIB-MF-BR

FIG. 10

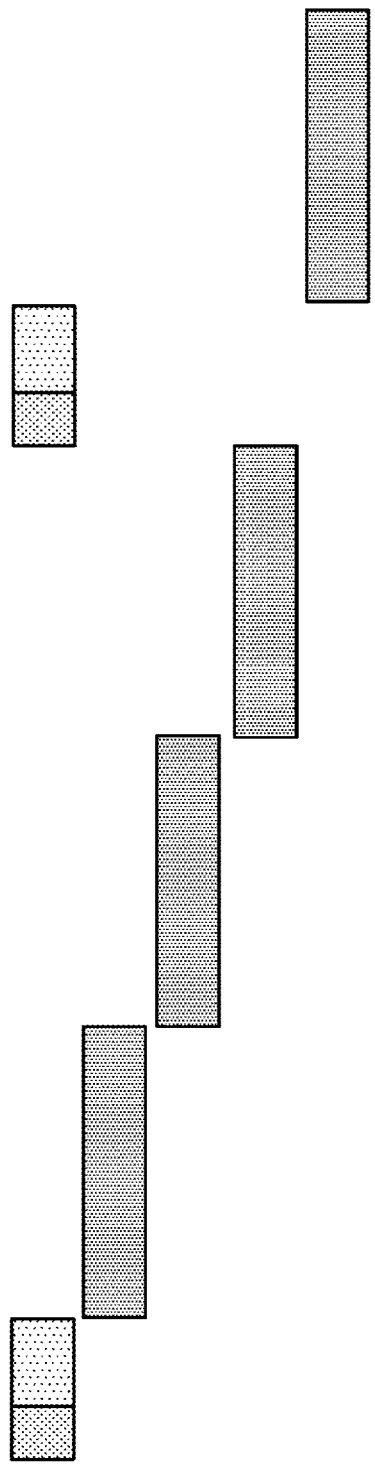

1500 ⟶

> Encode, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR) ⟵ 1510

| 1610 — Encoding, at the gNB, control information for periodic transmission on an anchor channel having a set frequency for U-IoT in an adaptive frequency hopping system, wherein the anchor channel comprises: a clear channel assessment (CCA) period; an extended CCA (eCCA) period when a failure occurs during the CCA period; a tuning period for radio frequency (RF) retuning with frequency hopping; and a control information communication period for communication of the control information |

1710 — Encoding, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR)

FIG. 17

ANCHOR CHANNEL DESIGN FOR UNLICENSED INTERNET OF THINGS (IOT)

CROSS-REFERENCE TO RELATED APPLICATIONS

The present application is a divisional of U.S. patent application Ser. No. 16/496,375 filed Sep. 20, 2019, which is a National Stage Entry of PCT/US2018/027368 filed Apr. 12, 2018, which claims the benefit of U.S. Provisional Patent Application Ser. No. 62/526,208 filed Jun. 28, 2017, U.S. Provisional Patent Application Ser. No. 62/487,306 filed Apr. 19, 2017, and U.S. Provisional Patent Application Ser. No. 62/484,748 filed Apr. 12, 2017, the entire disclosures of which are incorporated herein by reference.

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 10 illustrates an anchor channel in accordance with an example;

FIG. 12A illustrates SIB-MF/paging on an anchor channel in accordance with an example;

FIG. 15 depicts functionality of a Next Generation NodeB (gNB) operable to communicate over an anchor channel for Unlicensed Internet of Things (U-IoT) in accordance with an example;

FIG. 16 depicts a flowchart of a machine readable storage medium having instructions embodied thereon for communicating over an anchor channel for Unlicensed Internet of Things (U-IoT) in accordance with an example;

FIG. 17 depicts a flowchart of a machine readable storage medium having instructions embodied thereon for communicating over an anchor channel for Unlicensed Internet of Things (U-IoT) in accordance with an example;

Figure 1:
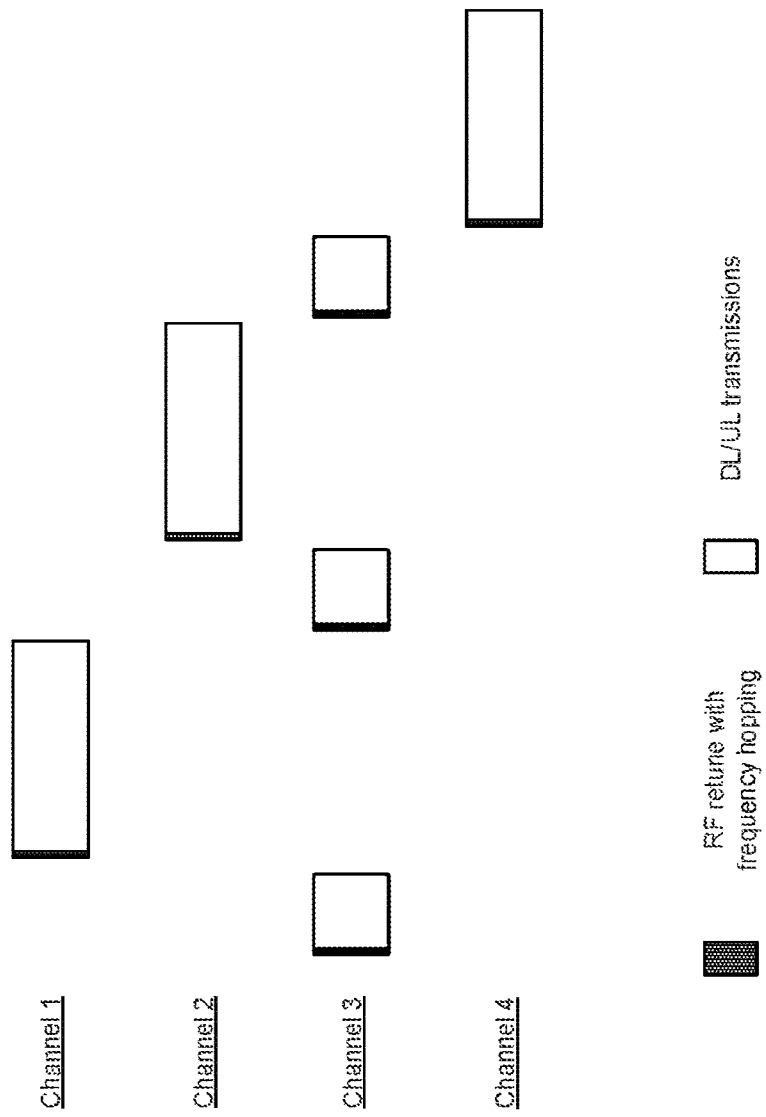
FIG. 1 illustrates a reduced dwell time for an anchor channel in relation to a data channel in a non-adaptive frequency hopping system in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Design of Anchor Channel for Unlicensed IoT

The present technology relates to Long Term Evolution (LTE) operation in an unlicensed spectrum in MulteFire (MF), and specifically Internet of Things (IoT) operating in the unlicensed spectrum, or Unlicensed-IoT (U-IoT).

In one example, IoT is envisioned as a significantly important technology component, by enabling connectivity between many devices. IoT has wide applications in various scenarios, including smart cities, smart environment, smart agriculture, and smart health systems. 3GPP has standardized two designs to support IoT services—enhanced Machine Type Communication (eMTC) and NarrowBand IoT (NB-IoT). As eMTC and NB-IoT UEs will be deployed in large numbers, lowering the cost of these UEs is a key enabler for the implementation of IoT. Also, low power consumption is desirable to extend the life time of the UE's battery. In addition, there are substantial use cases of devices deployed deep inside buildings, which would necessitate coverage enhancement in comparison to the defined LTE cell coverage footprint. In summary, eMTC and NB-IoT techniques are designed to ensure that the UEs have low cost, low power consumption and enhanced coverage.

With respect to LTE operation in the unlicensed spectrum, both Release 13 (Rel-13) eMTC and NB-IoT operates in a licensed spectrum. On the other hand, the scarcity of licensed spectrum in low frequency band results in a deficit in the data rate boost. Thus, there are emerging interests in the operation of LTE systems in unlicensed spectrum. Potential LTE operation in the unlicensed spectrum includes, but not limited to, Carrier Aggregation based licensed assisted access (LAA) or enhanced LAA (eLAA) systems, LTE operation in the unlicensed spectrum via dual connectivity (DC), and a standalone LTE system in the unlicensed spectrum, where LTE-based technology solely operates in the unlicensed spectrum without necessitating an "anchor" in licensed spectrum—a system that is referred to as MulteFire (MF). To extend the benefits of LTE IoT designs into unlicensed spectrum, MulteFire 1.1 is expected to specify the design for Unlicensed-IoT (U-IoT). The present technology falls in the scope of the U-IoT systems, with focus on the eMTC based U-IoT design. In addition, similar approaches can be used to NB-IoT based U-IoT designs as well.

In one example, the unlicensed frequency band of interest is the 2.4 GHz band for U-IoT, which has spectrum with global availability. For global availability, designs are to abide by regulations in different regions, e.g. the regulations given by the Federal Communications Commission (FCC) in the United States and the regulations given by European Telecommunications Standards Institute (ETSI) in Europe. Based on these regulations, frequency hopping can be more appropriate than other forms of modulations, due to more relaxed power spectrum density (PSD) limitations and co-existence with other unlicensed band technologies, such as Bluetooth® and Wifi®. Specifically, frequency hopping has no PSD limit, whereas other wide band modulations have a PSD limit of 10 decibel-milliwatts per megahertz (dBm/MHz) in the regulations given by ETSI. The low PSD limit would result in limited coverage. Thus, the present technology focuses on the U-IoT with frequency hopping.

In one example, at a given time, the UE does not know in which particular frequency the eNodeB will transmit, when the UE has not acquired the appropriate system information. Therefore, when the eNodeB is to transmit system information, the system information can be transmitted on an anchor channel, which can be at a frequency which is known to the UE, thereby reducing UE search time and power consumption. In other words, the anchor channel can be used to carry the system information.

With respect to an anchor channel for U-IoT, there are two types of frequency hopping systems—adaptive and non-adaptive. In both cases, essential system information (SI), such as discovery reference signal (DRS), physical broadcast channel (PBCH), paging, etc., can be transmitted on a limited number of anchor channels to reduce UE search time and power consumption. As discussed in further detail below, the present technology describes the design of the anchor channel for U-IoT. More specifically, the present technology describes an anchor channel design for a non-adaptive frequency hopping system, as well as an anchor channel design for an adaptive frequency hopping system.

In one configuration, with respect to an anchor channel design for the non-adaptive frequency hopping system, the eNodeB and UE can transmit and receive following a fixed hopping sequence. The hopping sequence can be derived from an eNodeB identifier (ID), such as a physical cell identity (PCI) or a cell global identity (CGI). The regulations can necessitate a minimum of 15 hopping channels, and a maximum dwell time for each hop can be 400 milliseconds (ms). A return time, which is defined as a maximum period within which a hop channel is reused, is equal to four multiplied by a channel dwell time multiplied by a number of hopping channels.

In one configuration, a DRS/PBCH transmission can be enabled on every hopping channel. For example, one mechanism for the DRS/PBCH transmission is to follow the LTE/MF1.0 design principle, and enable DRS/PBCH transmissions periodically (e.g., every 40 ms) on each hop channel, following a current time division duplexing (TDD) configuration, or a new TDD configuration defined in a system information block (SIB), or explicitly specified. However, one drawback of this approach is that when the UE starts to perform a cell search, the UE does not know which channel to monitor. As the hopping sequence is unknown to the UE before the UE acquires the eNodeB ID, the UE will randomly listen to certain channels and can hop randomly as well, which can result in an increased cell search period for initial access.

In one example, with respect to the anchor channel design for the non-adaptive frequency hopping system, there can be two cases. In a first case, the anchor channel can be periodic, i.e., the anchor channel can repeat on any channel. In this case, there is no real distinction between the anchor channel and a data channel. In a second case, the anchor channel can be different than the data channel. In this case, the anchor channel can be periodically repeated on a specific frequency, and the anchor channel can be longer or shorter than the data channel. In this case, the anchor channel can be periodically repeated on just one known frequency, thus distinguishing the anchor channel from the data channels.

In another example, a DRS/PBCH transmission can be enabled on a fixed channel with a frequent return. In order to allow a faster UE initial search and reduce UE power consumption, one anchor channel can be used to send the DRS/PBCH. A dwell time on the anchor channel can be the same or shorter, as compared to other data channels to allow a frequent return. In one example, transmissions on the anchor channel can follow a different DL/UL configuration as compared to the other data channels, or can be DL only. In addition, the fixed channel can be statically set, or can be dynamically set over another channel based on a channel state information (CSI) report or a channel quality indication (CQI).

FIG. 1 illustrates an anchor channel in a non-adaptive frequency hopping system. The non-adaptive frequency hopping system can also use data channels. In this example, the anchor channel can have a reduced dwell time in relation to the data channels in the non-adaptive frequency hopping system. In one example, a given dwell time on the anchor channel or one of the data channels can include a time used for radio frequency (RF) retuning with frequency hopping and a time used for DL/UL transmissions.

In the example shown in FIG. 1, channel 3 is the anchor channel and channels 1, 2 and 4 are data channels. As shown, channel 3 can have a reduced dwell time as compared to channels 1, 2 and 4.

Figure 2:
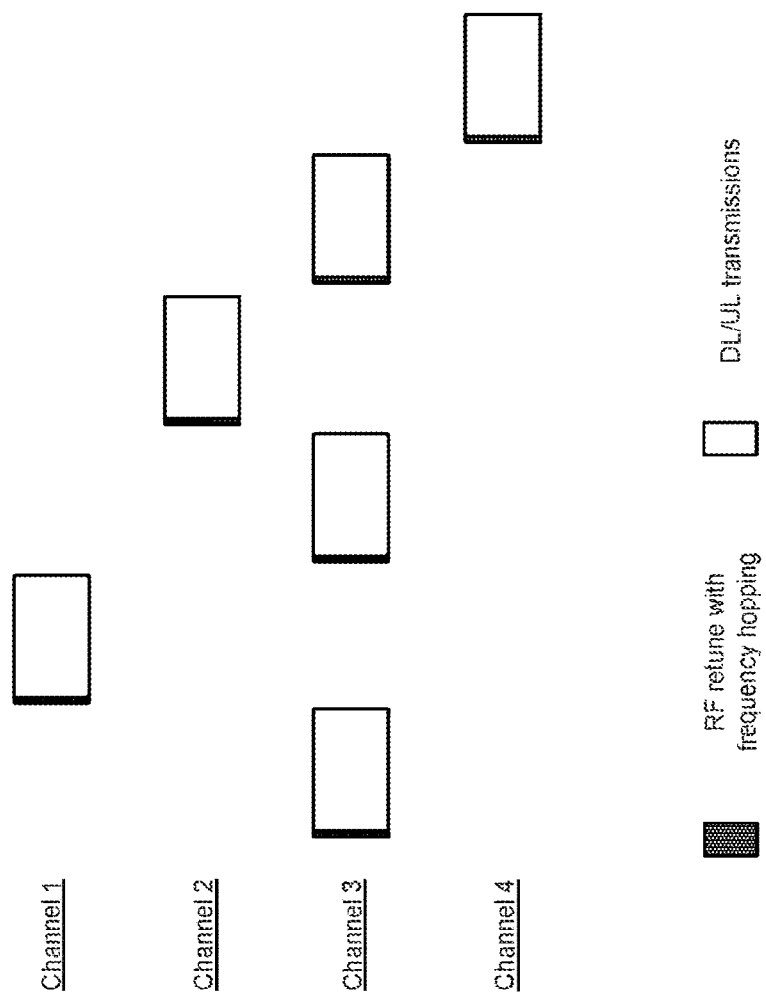
FIG. 2 illustrates a same dwell time for an anchor channel in relation to a data channel in a non-adaptive frequency hopping system in accordance with an example.

FIG. 2 illustrates an anchor channel in a non-adaptive frequency hopping system. The non-adaptive frequency hopping system can also use data channels. In this example, the anchor channel can have a same dwell time in relation to the data channels in the non-adaptive frequency hopping system. In one example, a given dwell time on the anchor channel or one of the data channels can include a time used for radio frequency (RF) retuning with frequency hopping and a time used for DL/UL transmissions.

In the example shown in FIG. 2, channel 3 is the anchor channel and channels 1, 2 and 4 are data channels. As shown, channel 3 can have a same dwell time as compared to channels 1, 2 and 4.

In one configuration, with respect to paging transmissions in the non-adaptive frequency hopping system, paging can be allowed in every hopping channel. For example, the UE can derive its own paging channel based on a paging occasion (PO) configuration, a frequency hopping sequence, and a dwell time of each channel.

In one configuration, with respect to SI transmissions in the non-adaptive frequency hopping system, an SI transmission window can span multiple hops, similar to eMTC, and the UE can determine the SI transmission window based on DRS/PBCH decoding. In addition, the SI can be transmitted on the anchor channel, and other data can be transmitted on the data channels.

In one configuration, with respect to random access channel (RACH) procedure transmissions in the non-adaptive frequency hopping system, RACH resources can be configured through a system information block for MuLTE-fire (SIB-MF). The RACH procedure can be a four-operation procedure, which is similar to legacy LTE systems. Based on a RACH resource configuration and a hopping sequence pattern and dwell time, the UE can derive an exact hopping channel and resource to send a RACH sequence. In addition, during the RACH procedure, the UE can monitor for a random access response (RAR) from the eNodeB during RAR a window. The RAR window can span a current eNodeB hopping channel or a next hopping channel.

In one configuration, with respect to an anchor channel design for an adaptive frequency hopping system with enhanced clear channel assessment (eCCA), the eNodeB can perform a listen before talk (LBT) before transmitting information. Before the eNodeB hops to a new channel, the eNodeB can perform a clear channel assessment (CCA). When the eNodeB succeeds in the CCA sensing, the eNodeB can begin a transmission, with a maximum transmission opportunity (TxOP) of 60 ms for the eNodeB. On the other hand, when the eNodeB fails in the CCA sensing, the eNodeB can start an eCCA procedure until the channel is clear. Alternatively, the eNodeB can hop to a next channel and perform CCA, where the skipped channel is not counted into the 15 minimum hopping limitation.

In one example, when the eNodeB continues to perform eCCA, the design of the DRS/PBCH/paging window/SI window transmission can be similar to the non-adaptive frequency hopping system, with a reduced transmission period on the anchor channel, or a skipped transmission when the eCCA is not successful. In addition, a longer DRS transmission window (DTxW) for DRS/PBCH transmissions can be configured on the anchor channel.

In one example, with respect to the anchor channel design for the adaptive frequency hopping system, the DRS/PBCH/paging/SI transmission can be performed on the anchor channel. In an alternative example, the DRS, PBCH and essential SI can be transmitted on the anchor channel, and remaining SI and paging can be transmitted on the data channels.

In one example, essential SI can be transmitted over a span of multiple hopping channels. For example, a portion of the essential SI can be transmitted over an anchor channel and a portion of the essential SI can be transmitted over a data channel.

In one configuration, with respect to the anchor channel design for the adaptive frequency hopping system, LBT is a channel access technique that uses CCA or eCCA. The anchor channel can perform CCA, and only when CCA fails, the anchor channel can also perform eCCA. The CCA and/or eCCA can be performed at a beginning of the anchor channel and a data channel to acquire a channel that is not being used. Similar to the anchor channel, the data channel can perform CCA, and only when CCA fails, the data channel can also perform eCCA. When the LBT succeeds, then a transmission is performed, which can include DL/UL bursts and RF tuning. The RF tuning can be fixed to 2 symbols for both channel switching and DL-UL switching. In addition, the anchor channel can be followed by one data channel, where a total dwell time is 80 ms (e.g., 5 ms for the anchor channel and 75 ms for the data channel).

Figure 3:
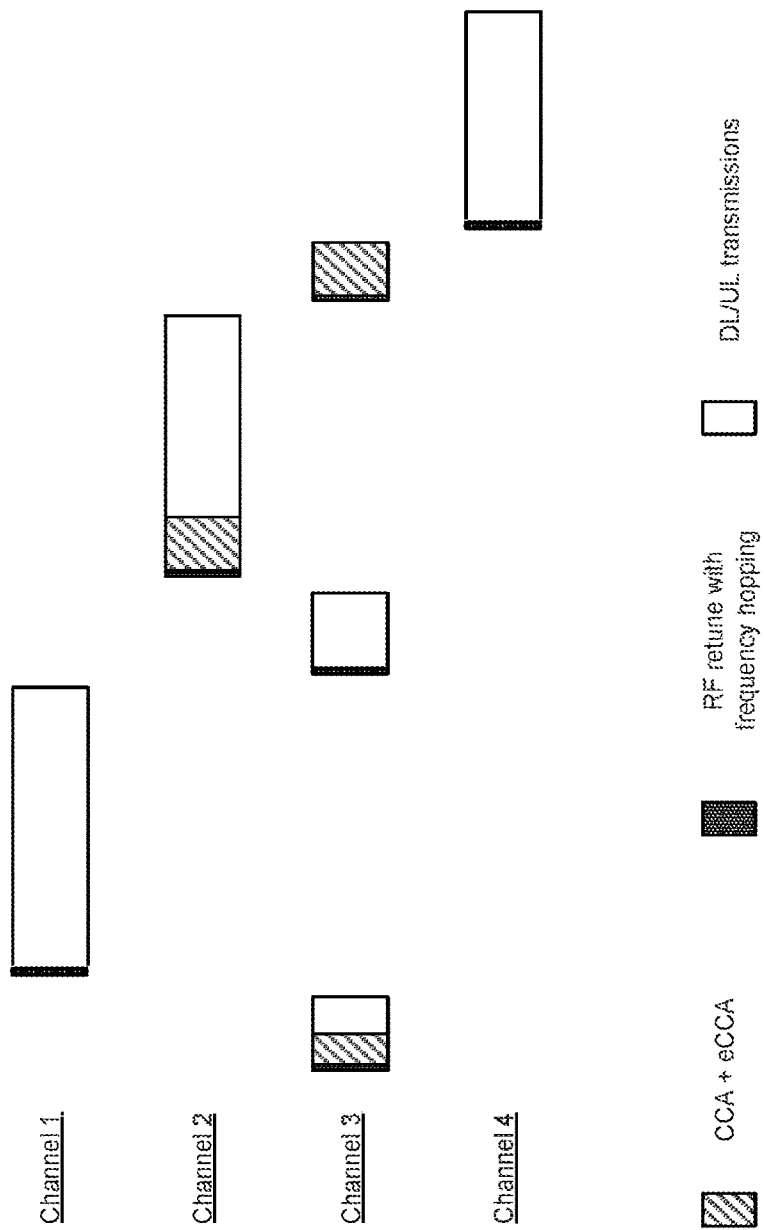
FIG. 3 illustrates a discovery reference signal (DRS)/physical broadcast channel (PBCH) transmission with enhanced clear channel assessment (eCCA) sensing in an adaptive frequency hopping system in accordance with an example.

FIG. 3 illustrates a discovery reference signal (DRS)/physical broadcast channel (PBCH) transmission with enhanced clear channel assessment (eCCA) sensing in an adaptive frequency hopping system. In this example, the anchor channel can have a different dwell time in relation to data channels in the adaptive frequency hopping system. In one example, a given dwell time on the anchor channel or one of the data channels can include a time used for radio frequency (RF) retuning with frequency hopping, a time used for CCA and/or eCCA sensing, and a time used for DL/UL transmissions.

In the example shown in FIG. 3, channel 3 is the anchor channel and channels 1, 2 and 4 are data channels. In this example, for a given dwell time, the anchor channel can have a reduced transmission period. In addition, for a given dwell time, the anchor channel can have a skipped transmission when the eCCA is not successful.

In one example, an anchor channel can follow adaptive frequency hopping. The anchor channel can perform CCA followed by eCCA. If the eCCA fails, the eNodeB does not transmit on the remaining dwell time. Otherwise, the eNodeB can transmit the DRS/PBCH.

In one configuration, with respect to the anchor channel design for the adaptive frequency hopping system, the eNodeB and UE can transmit and receive following a fixed hopping sequence. The hopping sequence can be derived from an eNodeB ID, such as a PCI or a CGI. The regulations can necessitate a minimum of 15 hopping channels, and a maximum dwell time for each hop can be 400 ms.

In one configuration, with respect to the adaptive frequency hopping system, a DRS/PBCH transmission can be enabled on every hopping channel. For example, one mechanism for the DRS/PBCH transmission is to follow the LTE/MF1.0 design principle, and enable DRS/PBCH transmissions periodically (e.g., every 40 ms) on each hop channel, following a current TDD configuration, or a new TDD configuration defined in a SIB, or explicitly specified. However, one drawback of this approach is that when the UE starts to perform a cell search, the UE does not know which channel to monitor. As the hopping sequence is unknown to the UE before the UE acquires the eNodeB ID, the UE will randomly listen to certain channels and can hop randomly as well, which can result in an increased cell search period for initial access.

In another example, with respect to the adaptive frequency hopping system, a DRS/PBCH transmission can be enabled on a fixed channel with a frequent return. In order to allow a faster UE initial search and reduce UE power consumption, one anchor channel can be used to send the DRS/PBCH. A dwell time on the anchor channel can be the same or shorter, as compared to other data channels to allow a frequent return. In one example, transmissions on the anchor channel can follow a different DL/UL configuration as compared to the other data channels, or can be DL only. In addition, the fixed channel can be statically set, or can be dynamically set over another channel based on a channel state information (CSI) report or a channel quality indication (CQI).

In one configuration, with respect to paging transmissions in the adaptive frequency hopping system, paging can be allowed in every hopping channel. For example, the UE can derive its own paging channel based on a paging occasion (PO) configuration, a frequency hopping sequence, and a dwell time of each channel.

In one configuration, with respect to SI transmissions in the adaptive frequency hopping system, an SI transmission window can span multiple hops, similar to eMTC, and the UE can determine the SI transmission window based on DRS/PBCH decoding.

In one configuration, with respect to RACH procedure transmissions in the adaptive frequency hopping system, RACH resources can be configured through a SIB-MF. Based on a RACH resource configuration and a hopping sequence pattern and dwell time, the UE can derive an exact hopping channel and resource to send a RACH sequence. In addition, during the RACH procedure, the UE can monitor for a RAR from the eNodeB during a RAR window. The RAR window can span a current eNodeB hopping channel or a next hopping channel, and the RAR window can be configurable by the eNodeB.

In one example, with respect to RACH procedure transmissions in the adaptive frequency hopping system, the RACH can be configured on a SIB carried on a data channel. In addition, a RAR window can extend on multiple hopping channels when the RAR window is larger than a dwell time of 80 ms.

In one example, in the adaptive frequency hopping system, a longer paging window and a longer SI window can be configured to different hops to accommodate the eCCA time. In addition, in the adaptive frequency hopping system, a RACH can be configured similar to the non-adaptive frequency hopping system, and a RAR window can be extended to allow a longer eCCA time.

In one configuration, with respect to an anchor channel design for adaptive frequency hopping system with skipping, after the eNodeB performs LBT and when CCA fails, the eNodeB can skip the channel and hop onto another channel to perform CCA sensing. This can help the eNodeB to skip busy channels that are occupied by other unlicensed bands, such as WiFi®, and avoid a relatively long eCCA sensing time. However, the eNodeB skipping the channel based on the CCA sensing can create issues for idle mode UEs or UEs configured for discontinuous reception (DRX) in terms of tracking which channel the eNodeB is currently on.

In one example, an anchor channel design can include only the CCA. For example, if the CCA fails, then there is no transmission on the remaining dwell time. In other words, in this example, the eCCA is not performed.

In one example, the anchor channel can be defined regardless of hopping. For example, to ensure a faster UE initial access, and reception of paging/SI information, the anchor channel can be defined periodically regardless of whether channels are skipped. In another example, for the anchor channel, the eCCA procedure can be performed instead of hoping to a next channel to allow an increased amount of transmission opportunity.

As an example, there can be 9 total channels 1-9), with channel 1 being the anchor channel. The hopping sequence derived for the eNodeB ID can be 1 2 3 4 5 1 6 7 8 9 1 2 3 4 5 1 6 7 8 9, where a channel 1 dwell time is half of the other channels to allow a more frequent return to channel 1. In case channel 3/7 is busy and skipped in the first time, the new hopping sequence can be 1 2 4 5 6 1 8 9 2 3 1 4 5 6 7 1 8 9.

In one configuration, with respect to the anchor channel design for adaptive frequency hopping system, the DRS, PBCH, paging and/or SI transmissions can be performed on the anchor channel. In addition, multiple anchor channels can be defined to increase a paging capacity.

In one configuration, with respect to the anchor channel design for adaptive frequency hopping system, RACH transmissions can be configured on the anchor channel only, where the RAR is also on the anchor channel. Alternatively, the RACH transmission can be configured in any hopping channel. For example, the UE can decode the RACH configuration from a SIB-MF, and the UE can follow the RACH configuration to derive the hopping channel. The UE can perform a presence detection of the eNodeB camping on a certain channel, before performing a RACH transmission. In addition, a RAR window can span a current hopping channel, or a next hopping channel.

In one example, the anchor channel can be restricted to a few channels, where the number of channels and a related hopping sequence can be predefined or derived based on a cell ID. In addition, the hopping channel sequence for the non-anchor channel can be signaled in the SIB, e.g., SIB #1, SIB #8 or SIB #2.

In one example, one bit can be configured in the MIB or SIB to indicate whether or not the frequency hopping system is operating under the skip scheme. In another example, one bit can be configured in the MIB or SIB to indicate whether the frequency hopping system operates is non-adaptive or adaptive. In yet another example, a bitmap can be configured in the SIB, where each bit corresponds to one channel, to indicate whether or not that channel is skipped.

In one configuration, the SIB can configure the hopping sequence. For example, the SIB can configure a hopping sequence to avoid channels where WiFi® is deployed, while a configured number of hopping channels satisfies a regulation, such as at least 15 channels for Frequency Hopping Spread Spectrum (FHSS) systems.

In one example, a set of hopping sequences can be predefined, and the SIB can indicate the hopping sequence via its index within predefined sets of possible hopping sequences. By defining N sets of hopping sequences, ceil (log 2(N)) bits can be used in the SIB for the indication, where N is an integer and ceil( ) is a function that returns a smallest integer greater than or equal to a given number. In another example, a bitmap corresponding to all potential channels available for the systems on the operating band can be used to indicate specific channels to be hopped on and specific channels to be avoided. A number of bits used for the bitmap can be based on the number of all potential channels in the band.

In one example, the indexes of the channels that are to be avoided by the hopping sequence can be indicated by the SIB. Alternatively, the index of channels that the hopping sequence includes can be indicated by the SIB.

As an example, when there are in total M channels in the band and only one channel is to be precluded, the number of bits used can be equal to ceil(log 2(M)), where M is an integer. As another example, when there are in total M channels in the band and a set of continuous channels are to be precluded, the number of bits used can be equal to 2*ceil(log 2(M)), where ceil(log 2(M)) bits can be used to indicate a starting channel index and the remaining ceil(log 2(M)) bits can be used to indicate an ending channel index to be precluded.

In one example, a one-bit indication can be provided in the anchor channel to indicate when a paging message is transmitted on the data channel. In another example, hopping channel sequences for the data channels can be signaled in the SI. For example, the hopping channel sequences for the data channels (or non-anchor channels) can be indicated in the anchor channel.

In one example, one bit can be transmitted in the MIB or SIB to indicate whether or not a skip is performed. One bit can be transmitted in the MIB or SIB to indicate whether adaptive or non-adaptive frequency hopping is used. A bitmap can be transmitted to indicate channel skipping. In addition, a hopping sequence can be configured through the SIB by using a bitmap or an indication.

In one configuration, an anchor channel can operate in an adaptive frequency hopping manner. The anchor channel can be separate from a data channel. The anchor channel can be periodic and occurs at a specific frequency. The anchor channel can include the DRS/PBCH and essential SI. On the anchor channel, CCA and eCCA can be performed. On the anchor channel, two symbols can be used for frequency tuning, and remaining symbols can be used to transmit the DRS/PBCH and SI. In one example, the RACH can be configured in an adaptive manner, and a RAR window can be extendable and can be on different frequency hops. In addition, a hopping channel sequence for a non-anchor channel can be signaled on the anchor channel as essential SI.

In one configuration, an anchor channel for unlicensed IoT (IoT-U or U-IoT) can be defined. In one example, the U-IoT can be a non-adaptive frequency hopping system. In another example, the U-IoT can be an adaptive frequency hopping system.

In one example, discovery reference signals (DRS)/physical broadcast channel (PBCH) can be periodically transmitted in every hopping channel. In another example, the DRS/PBCH can be transmitted on a fixed anchor channel.

In one example, the anchor channel can be returned more frequently within a regulation limitation. In another example, the anchor channel can reduce a dwell time for more frequent transmission. In yet another example, the anchor channel can be a downlink (DL) only transmission of a DRS, a PBCH, a system information block (SIB) and a paging message.

In one example, a paging window can be configured in all hopping channels. In another example, an SI window can span multiple hops. In yet another example, a random access channel (RACH) can be configured in all hopping channels. In a further example, a random access response (RAR) window can span multiple hops.

In one example, whether an eNodeB performs an enhanced clear channel assessment (eCCA) after a clear channel assessment (CCA) fails, or whether the eNodeB hops to a next channel, can be configured through a higher layer configuration. In another example, when an eNodeB is configured with eCCA, the DRS/PBCH can be configured in a fixed anchor channel, with a longer DRS transmission window (DTxW) to accommodate an eCCA time. In yet another example, when the eNodeB is configured with eCCA, a paging window can be configured on each hop, with a longer window size to accommodate the eCCA time.

In one example, when the eNodeB is configured with eCCA, an SI window can be configured on each hop, with a longer window size to accommodate the eCCA time. In another example, when the eNodeB is configured with eCCA, the RACH can be configured on different channels. In yet another example, when the eNodeB is configured with eCCA, a RAR with a longer window can be configured across multiple hops.

In one example, when the eNodeB is configured for skipping a channel after a CCA fail, a skipping channel can apply to a non-anchor channel. In another example, when the eNodeB is configured for skipping a channel after a CCA fail, the anchor channel can perform eCCA to ensure a DRS/PBCH/paging/SI transmission. In yet another example, when the eNodeB is configured for skipping a channel after a CCA fail, a DRS/PBCH/paging window/SI window can be configured in a fixed anchor channel only, with a longer DTxW to accommodate the eCCA time.

In one example, when the eNodeB is configured for skipping a channel after a CCA fail, a RACH/RAR window can be configured in a fixed anchor channel only. In another example, when the eNodeB is configured for skipping a channel after a CCA fail, a RACH/RAR window can be configured in every channel, and the UE can detect an actual valid hop channel before each hop.

In one example, a SIB can indicate the hopping sequence. In another example, the SIB can be configured to avoid certain channels, e.g., channels where Wi-Fi® is deployed, while a configuration of the hopping mechanism satisfies a regulation, such as at least 15 channels for Frequency Hopping Spread Spectrum (FHSS) systems. In yet another example, a set of hopping sequences can be predefined, and the SIB can indicate one of these candidates via an index in the set.

In one example, a bitmap corresponding to all potential channels can be used in the SIB for indication of hopping channels. In another example, indexes of channels to be avoided or to be included in the hopping sequence can be indicated by the SIB. In yet another example, a master information block (MIB) or a SIB can indicate whether an adaptive or non-adaptive frequency hopping mechanism is used in the network.

Signaling Design for Anchor Channel for Unlicensed Cellular IoT (CIoT)

The present technology relates to LTE operation in an unlicensed spectrum in MulteFire (MF), and specifically Internet of Things (IoT) operating in the unlicensed spectrum, or Unlicensed-IoT (U-IoT). Further, the present technology relates to an anchor channel design that provides power efficiency cell search and enhanced discontinuous reception (eDRX) operation. The anchor channel design can include a PSS/SSS/PBCH/SIB-MF design and a description of content on the anchor channel. The signaling content of the anchor channel for U-IoT can include PSS/SSS, PBCH and SIB-BR (bandwidth reduced).

In one configuration, with respect to a PSS/SSS/PBCH transmission on the anchor channel, to reduce a UE search complexity (particularly for a UE in idle mode or a long eDRX), the PSS/SSS/PBCH can be transmitted on fixed anchor channels. For example, one or more anchor hopping channels can be defined. In one example, an eNodeB can send a discovery reference signal (DRS) on one of the anchor channels. In another example, the eNodeB can send the DRS on every anchor channel. Once the anchor channels are selected among available channels, an initialization to define a pseudo random hopping sequence can be chosen, such that the anchor channels can follow a specific pattern. For example, when the pseudo random hopping sequence is sufficiently long, the anchor channels can be spread out to reduce a time that occurs between anchor channels. In addition, different eNodeBs can have different pseudo random hopping sequences. Based on the pseudo random hopping sequence, an eNodeB can hop to an anchor channel at a different time, which can randomize interference between different eNB s.

Figure 4:
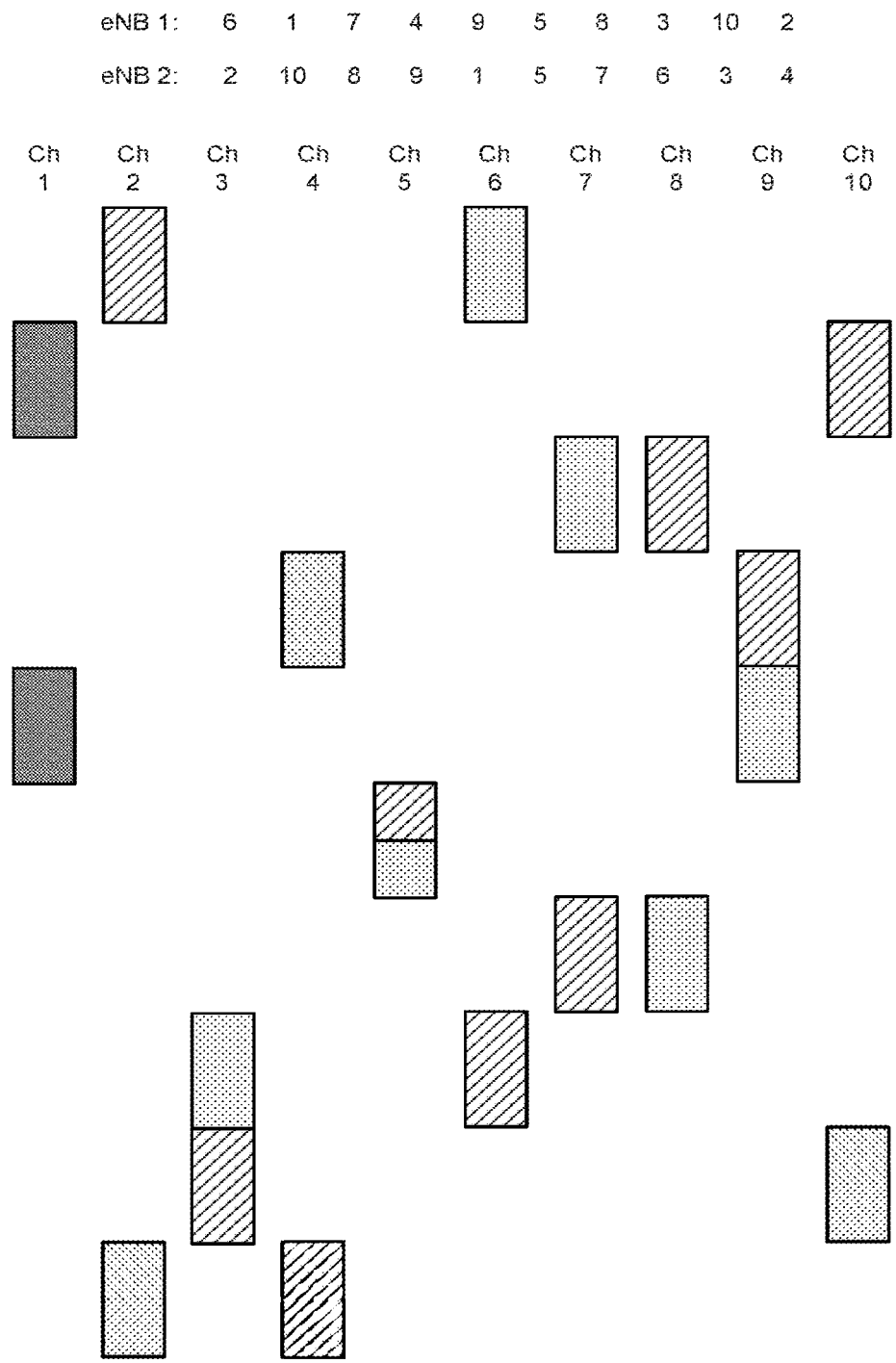
FIG. 4 illustrates an anchor channel transmission in a frequency hopping system in accordance with an example.

FIG. 4 illustrates an exemplary anchor channel transmission in a frequency hopping system. In this example, two eNodeBs can employ random hopping channels. In this example, radio frequency (RF) Channel #1 can be the anchor channel. A first eNodeB (eNB1) can transmit a DRS on a second hop on Channel #1, and a second eNodeB (eNB2) can transmit a DRS on a fifth hop on Channel #1. In addition, in this example, Channel #5 can have a collision between the hopping sequences. For example, the first eNodeB and the second eNodeB can attempt to transmit on Channel #5 at the same time.

Figure 5:
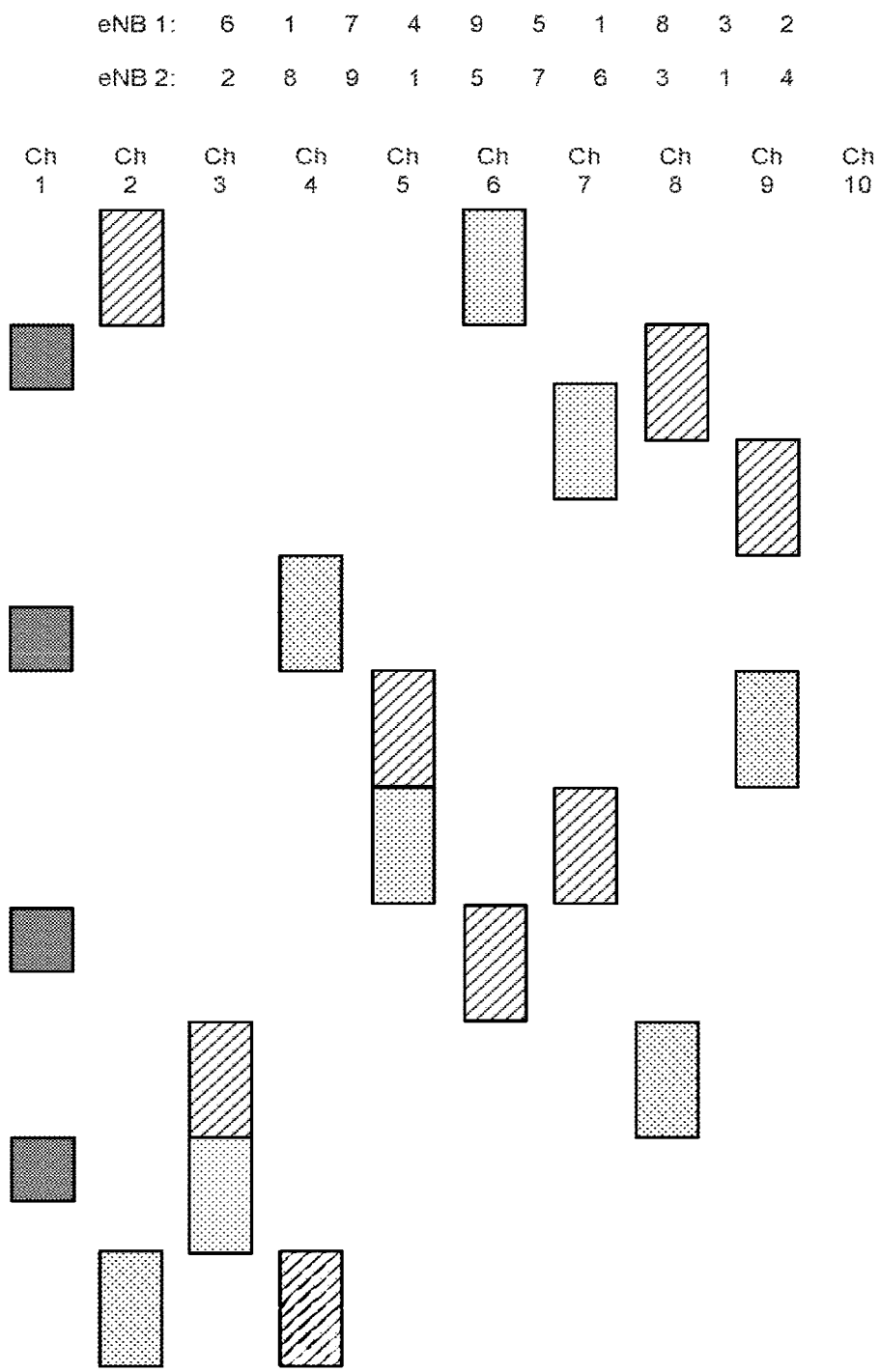
FIG. 5 illustrates another anchor channel transmission in a frequency hopping system in accordance with an example.

FIG. 5 illustrates an exemplary anchor channel transmission in a frequency hopping system. The anchor channel transmission can occur with half a dwell time as compared to a data channel dwell time. In this example, two eNodeBs can employ random hopping channels. In this example, radio frequency (RF) Channel #1 can be the anchor channel. Further, a DRS can be transmitted in half of the dwell time as compared to the data channel dwell time. For example, the data channel dwell time can be 80 microseconds (ms) in duration, while the DRS can be 40 ms in duration. A first eNodeB (eNB1) can transmit a DRS on a second hop and a seventh hop on Channel #1, and a second eNodeB (eNB2) can transmit a DRS on a fourth hop and a ninth hop on Channel #1. In this example, Channel #5 does not have a collision between the hopping sequences.

In one configuration, with respect to a PSS/SSS/PBCH design, the PSS/SSS can reuse a Wideband Coverage Enhancement (WCE) DRS design. Different from eMTC and NB-IoT which applies to narrowband operation, the WCE is of interest to MulteFire 1.1 with an operation bandwidth of 10 MHz and 20 MHz. The objective of WCE is to extend the MulteFire 1.0 coverage to meet industry IoT market specifications, with the targeting operating bands at 3.5 GHz and 5 GHz. In one example, the PSS/SSS can occupy 6 resource blocks (RBs) and can reuse a MF1.1 WCE design. In another example, a WCE DRS can be further repeated to satisfy an increased reliability specification.

In one example, the PSS/SSS can use a narrowband PSS (NPSS)/narrowband SSS (NSSS)/narrowband PBCH (NPBCH)-like design. For example, the PSS/SSS/PBCH can occupy 1 RB, and can use a NPSS/NSS/NPBCH like design. In narrowband IoT (NB-IoT), a first 3 OFDM symbols can be left open for backward compatibility with an LTE PDCCH transmission. Here, the PSS/SSS can be extended from 11 symbols to 14 symbols, by extending a length-11 cover code to a length-14 cover code. For NPBCH, the first 3 symbols can be used for rate matching into the 14 symbols.

Figure 6:
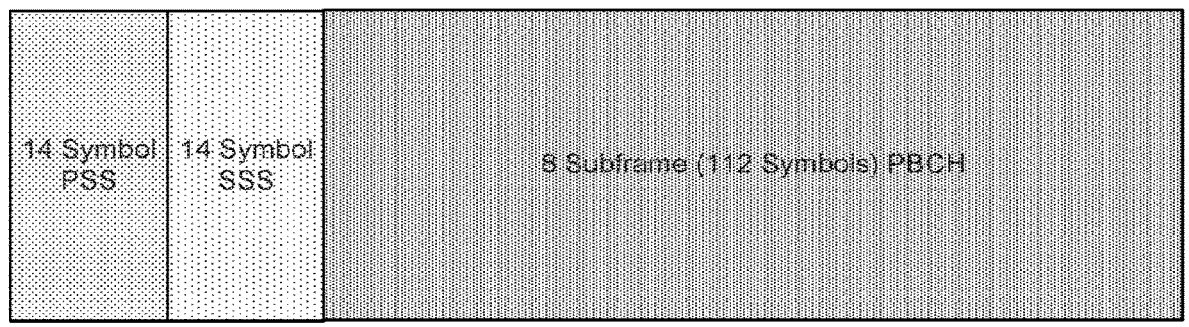
FIG. 6 illustrates a primary synchronization signal (PSS), a secondary synchronization signal (SSS) and a physical broadcast channel (PBCH) in a discovery reference signal (DRS) design in accordance with an example.

FIG. 6 illustrates an example of a PSS/SSS/PBCH in a DRS design. In this DRS design, the PSS can occupy 14 symbols, the SSS can occupy 14 symbols and the PBCH can occupy 112 symbols (or 8 subframes).

In one configuration, with respect to a SIB-MF for eMTC-U, in a DRS with wideband PSS/SSS/PBCH, the SIB-MF for eMTC-U can be located in a subframe after a 6RB PSS/SSS/PBCH transmission. In a DRS with narrowband PSS/SSS/PBCH, the SIB-MF for eMTC-U can be transmitted in the remaining 5 RBs of the DRS.

Figure 7:
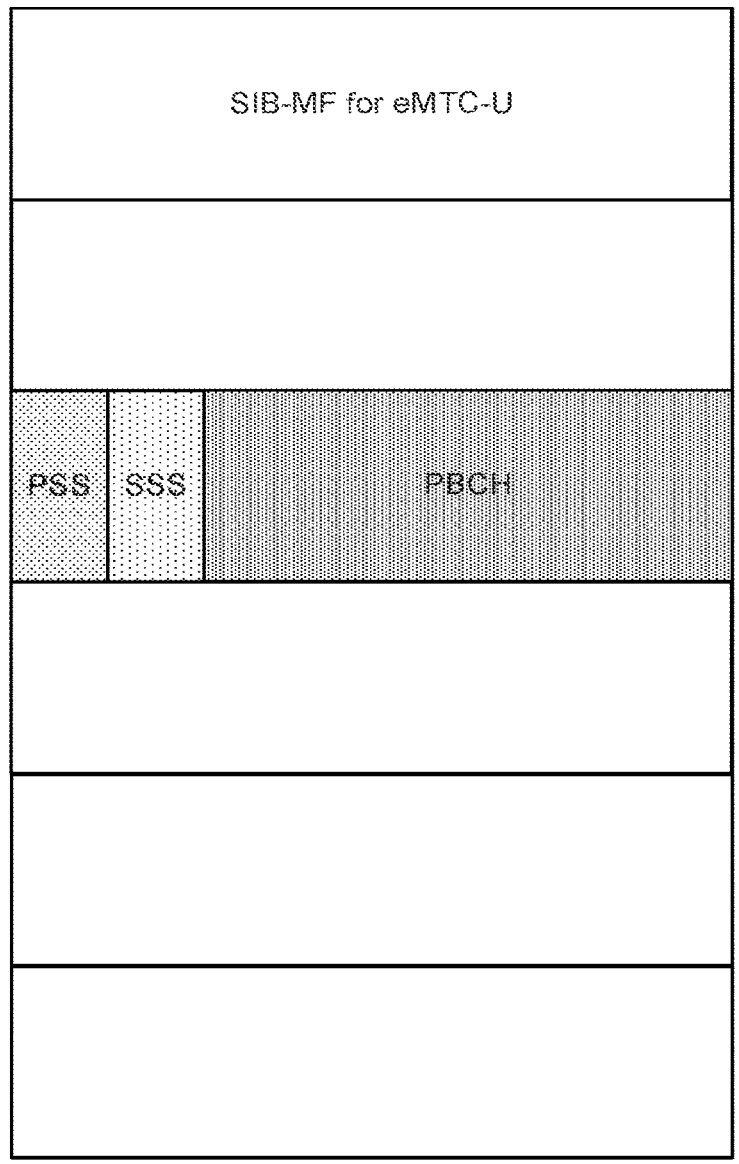
FIG. 7 illustrates a system information block for Multe-Fire (SIB-MF) transmission with a one resource block (1-RB) PSS, SSS and PBCH in accordance with an example.

FIG. 7 illustrates an example of a SIB-MF transmission with a one resource block (1-RB) PSS/SSS/PBCH. In this example, for a DRS with narrowband PSS/SSS/PBCH, the SIB-MF for eMTC-U can be transmitted in the remaining 5 RBs of the DRS.

Figure 8:
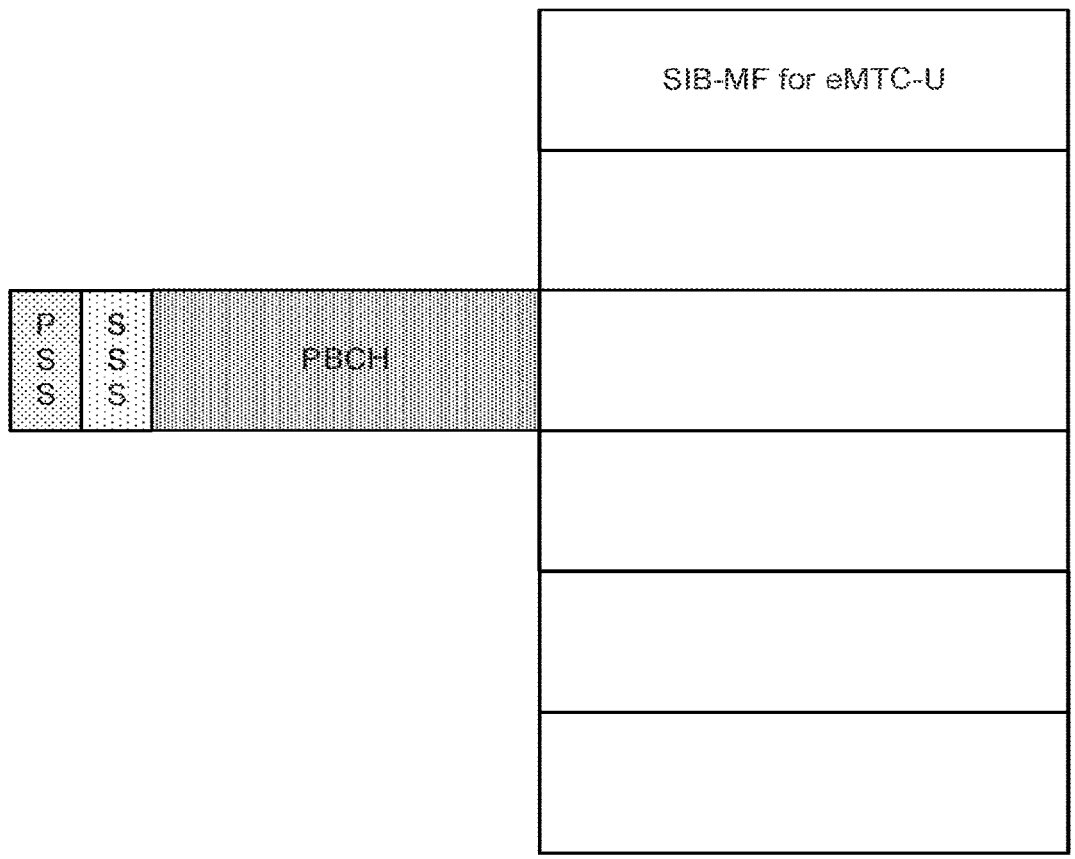
FIG. 8 illustrates another SIB-MF transmission with a 1-RB PSS, SSS and PBCH in accordance with an example.

FIG. 8 illustrates an example of a SIB-MF transmission with a 1-RB PSS/SSS/PBCH. In this example, for a DRS with narrowband PSS/SSS/PBCH, the SIB-MF for eMTC-U can be transmitted after the PSS/SSS/PBCH.

In one example, when the anchor channel dwell time is too small, the SIB-MF for eMTC-U can be transmitted in a data channel. In this case, the PBCH can indicate which channel is a next hopping channel in non-frequency adaptive hopping. Alternatively, the PBCH can indicate the next hopping channel as an entire hopping sequence for an adaptive frequency hopping system.

In one example, with respect to a PBCH payload, the PBCH can include a system frame number (SFN). The PBCH can include SIB-MF scheduling information, which can include a transport block size (TB S) an a number of repetitions. When the PSS/SSS/PBCH is 6RB, the SIB-MF scheduling information may not be necessary, and the scheduling SIB-MF can be sent in an ePDCCH after the PBCH transmission. In addition, when the SIB-MF is transmitted on a data channel, the PBCH can indicate a next hopping channel for frequency non-adaptive hopping, or the PBCH can include a hopping sequence and a next hopping channel and a dwell time for adaptive hopping.

In one example, with respect to a SIB-MF payload, other than legacy SIB-MF1 content which includes essential information for a random access channel (RACH) procedure, the SIB-MF can indicate a dwell time of each data channel for a frequency hopping system. In one example, the SIB-MF can also indicate a downlink (DL) duration of the dwell time, followed by an uplink (UL) duration of the dwell time, where a DL max duration per enhanced clear channel assessment (eCCA) can be 60 ms.

In one configuration, a technique for DRS transmission on an anchor channel for unlicensed IoT (IoT-U or U-IoT) is described. The DRS can be transmitted in every anchor channel. Alternatively, the DRS can be transmitted in one of the anchor channels. In one example, an eNodeB can generate a pseudo-random hopping sequence, which can randomize a transmission time of the DRS on the anchor channel.

In one example, a PSS/SSS/PBCH transmission can be 6 RBs and can reuse a WCE design. In another example, the PSS/SSS/PBCH transmission can be 1 RB and can use a similar design as NB-IoT. In one example, a PSS can be extended from 11 symbols to 14 symbols by extending a cover code from 11 to 14. In another example, a SSS can be extended from 11 symbols to 14 symbols by extending a cover code from 11 to 14. In one example, a PBCH can be extended from 11 symbols to 14 symbols per subframe through rate matching.

In one example, a SIB-MF for eMTC-U can be scheduled on the anchor channel. In another example, the SIB-MF for eMTC-U can be scheduled and transmitted after a 6-RB PSS/SSS/PBCH transmission. In yet another example, the SIB-MF for eMTC-U can be scheduled and transmitted after a 1-RB PSS/SSS/PBCH transmission. In a further example, the SIB-MF for eMTC-U can be scheduled and transmitted using the other 5 RBs adjacent to the 1-RB PSS/SSS/PBCH transmission. In yet a further example, the SIB-MF for eMTC-U can be scheduled on DRS and transmitted data channels.

In one example, a PBCH can be used to indicate a SFN of SIB-MF for eMTC-U scheduling information. In another example, the SIB-MF for eMTC-U can indicate a dwell time of each channel. In yet another example, the SIB-MF for eMTC-U can be used to indicate a DL duration and an UL duration in an adaptive frequency hopping system.

DRS Design for LBT Based FH System

The present technology relates to LTE operation in an unlicensed spectrum in MulteFire (MF), and specifically Internet of Things (IoT) operating in the unlicensed spectrum, or Unlicensed-IoT (U-IoT). Further, the present technology relates to an anchor channel design in a frequency hopping (FH) system operating in an enhanced Machine Type Communication (eMTC) unlicensed spectrum (eMTC-U) system.

In one configuration, with respect to the eMTC-U system, LBT can be supported on an adaptive frequency hopping (FH) system composed of at least 15 hopping channels regardless of whether operation occurs on an anchor channel or one of the data channels. Within a fixed dwell time, the LBT can have a flexible starting position, which may be an issue for the anchor channel, where only essential elements (e.g., PSS, SSS, PBCH, and PDCCH, e.g., for paging and SIB) can be transmitted. In fact, the dwell time of an anchor channel can be very limited, and is generally kept as short as possible to reduce an initial access delay. As described in further detail below, the anchor channel can be designed over a FH system in order to alleviate the drawbacks derived from the utilization of LBT, which can heavily impact the overall performance of the system. For example, as described in further detail below, the anchor channel can be designed to include PSS/SSS/PBCH, and a time alignment can be associated with the anchor channel.

In previous solutions, content within the anchor channel can include the PSS, SSS, PBCH, a physical downlink control channel (PDCCH) for paging/SIB-MR and/or a physical downlink shared channel (PDSCH) for paging/SIB-MR, and a positioning reference signal (PRS).

Figure 9A:
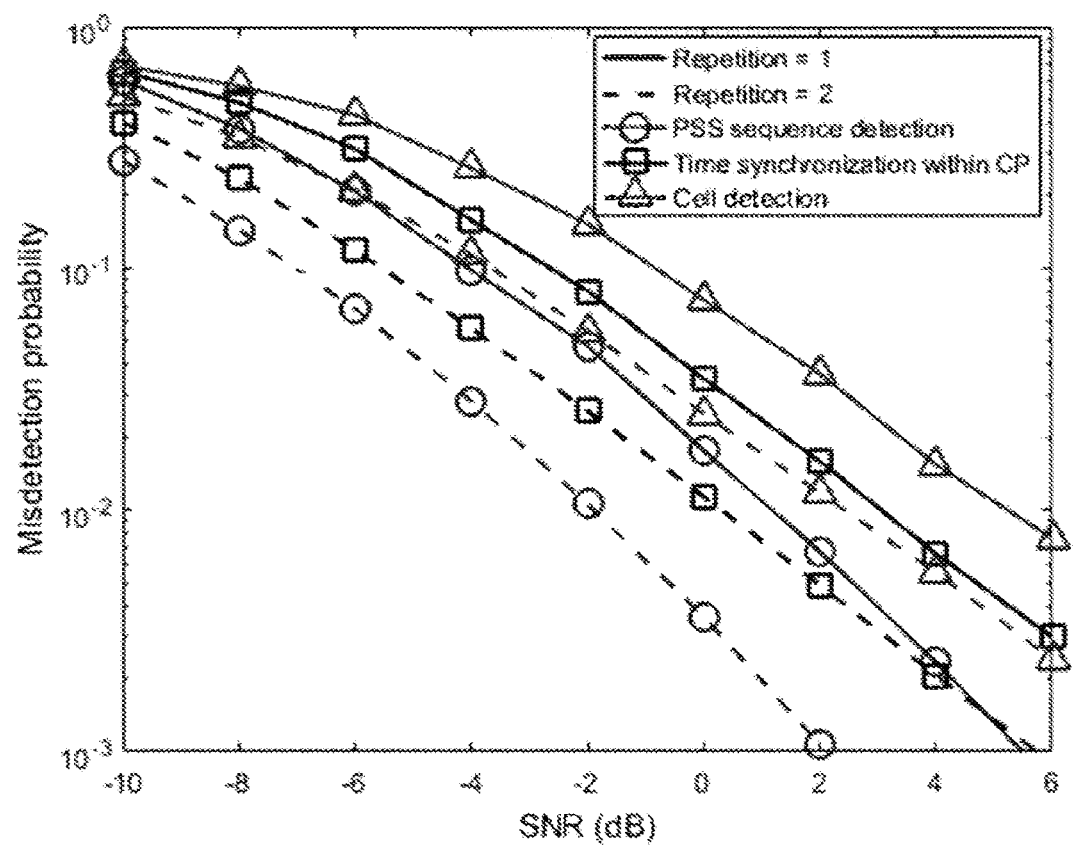
FIG. 9A illustrates a PSS and MF-PSS performance and a SSS and MF-SSS performance with respect to block error rate (BLER) versus signal to noise ratio (SNR) in accordance with an example.

FIG. 9A illustrates an exemplary PSS and MF-PSS performance and a SSS and MF-SSS performance with respect to block error rate (BLER) versus signal to noise ratio (SNR) (in decibels (dB)). In this scenario, two transmitting antenna and one receiving antenna can be used.

Figure 9B:
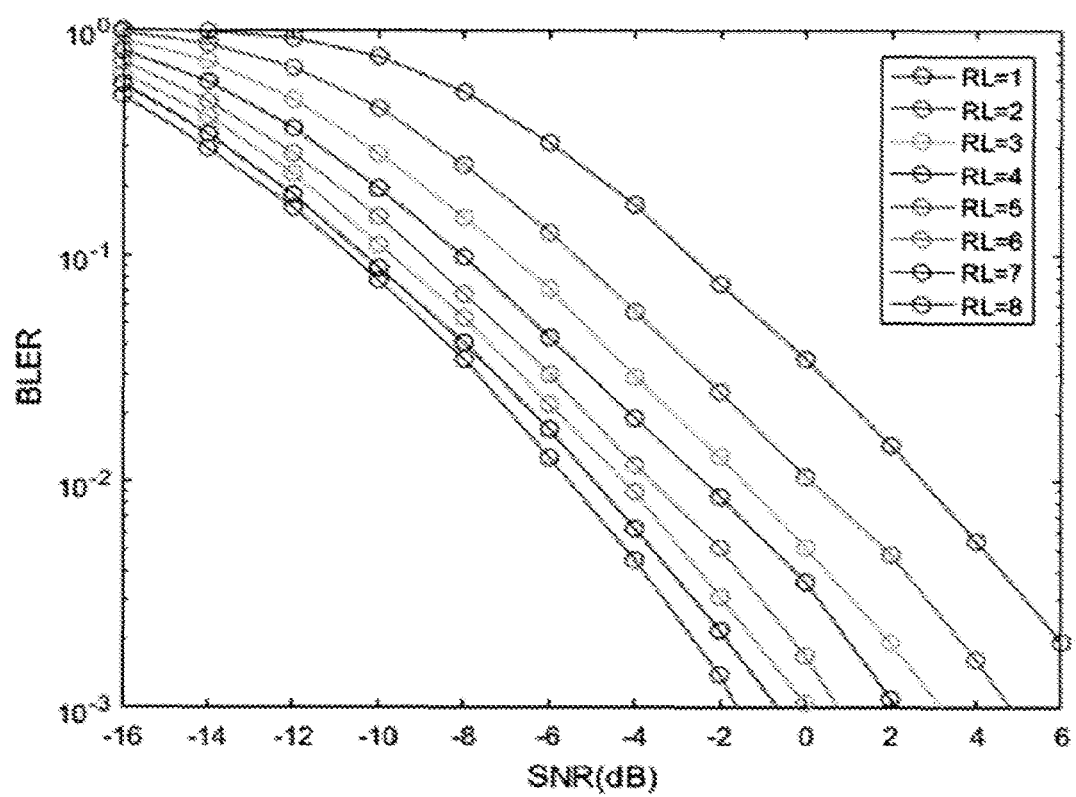
FIG. 9B illustrates a PBCH performance with respect to BLER versus SNR in accordance with an example.

FIG. 9B illustrates an exemplary PBCH performance with respect to BLER versus SNR (in dB). In this scenario, two transmitting antenna and one receiving antenna can be used.

In the present technology, with respect to content on the anchor channel, one or multiple elements can be contained within one transmission. For example, one of the following options can be adopted: a first element (element 1) can include a PSS and SSS, a second element (element 2) can include a PBCH, a third element (element 3) can include an LTE-M1 physical downlink control channel (MPDCCH) and/or a corresponding PDSCH for paging/SIB-MF, and a fourth element (element 4) can include a PRS, In one example, one or multiple information/channels can be transmitted within one dwell time on one anchor channel, and these can be transmitted at different times. The option adopted related to the specific content for the anchor channel can be statically defined, or it can vary dynamically. In addition, the content can be extended to a multiple anchor channel case, e.g., PSS/SSS/PBCH on anchor channel 1, and PDCCH for paging/SIB-MF on the other anchor channel.

FIG. 10 illustrates examples of an anchor channel. In a first example, the anchor channel can include a PSS/SSS/PBCH transmission and a PSS/SSS/MPDCCH transmission. In a second example, the anchor channel can include a PSS/SSS/PBCH transmission and a MPDCCH transmission. In a third example, the anchor channel can include a PSS/SSS/PBCH/MPDCCH transmission. In a fourth example, the anchor channel can include a PSS/SSS/PBCH transmission and a PBCH/MPDCCH transmission. In a fifth example, the anchor channel can include a PSS/SSS/PBCH/PDSCH of paging or SIB-MF-BR (bandwidth reduced) transmission.

In one configuration, with respect to a PSS/SSS design, the PSS/SSS/PBCH can span on every available subframe, e.g., 2 or 4 subframes, and different options can be used to distinguish different subframes. For example, in a first option, a first subframe can reuse a legacy DRS structure, where OFDM symbol #2/#3/#5/#6 can be utilized for MF-SSS, MF-PSS, SSS and PSS transmissions, respectively. In subsequent subframes, following the first subframe, a position of the MF-PSS and SSS, and a position of the MF-SSS and PSS, can be switched. In a second option, the PSS can be repeated over multiple subframes, and an orthogonal cover code (OCC) sequence can be applied to a repeated PSS, with the intent of discerning the PSS repetitions, while the SSS and PBCH can be maintained, e.g., content and an OFDM position.

In one example, the PSS and SSS can be contained in a first subframe, and can be spanned to two subframes.

In one configuration, one subframe can be dedicated for a synchronous signal transmission, and/or remaining OFDM symbols for PBCH. Subsequently, the PBCH and/or MPDCCH (and/or PDSCH) can be transmitted in following subframes. In a first subframe, there can be x0, x1, y0, y1 OFDM symbols for PSS, MF-PSS, SSS, and MF-SSS, respectively, and there can be z OFDM symbols for the PBCH. Here, $14 \geq x0$ x1, y0, y1 $z \geq 0$, and $x0+x1+y0+y1+z <= 14$. For example, this subframe may contain, e.g., 4 PSS OFDMs and 4 SSS OFDMs. Alternatively, this subframe may contain 2 PSS+2 MF PSS, and 2 SSS+2 MF-SSS. For one synchronous signal, multiple repetitions can be located in contiguous OFDM symbols. Alternatively, different synchronous signals can be located in an interleave manner. A first symbol can start with multiple PSS sequences and subsequent symbols can be for SSS, or vice versa. For multiple PSS symbols, an OCC can be applied on the multiple PSS symbols to achieve an improved correlation characteristic. In addition, when the PSS/SSS is extended to a second subframe the PSS/SSS can occupy beginning OFDM symbols, e.g., 2, 3, 4, or 5.

In one configuration, with respect to a PBCH design, the PBCH can be transmitted at the anchor channel. In addition to resource elements (REs) for a cell-specific reference signal (CRS) and PSS/SSS/MF-PSS/MF-SSS, remaining REs can be utilized for the PBCH transmission, e.g., OFDM symbol #0/#1 of a first subframe.

In one example, when the PSS/SSS are transmitted in initial OFDM symbols of one or two subframes, legacy OFDM symbols in later subframes, e.g., #2/3/5/6, can be utilized for the PBCH transmission (which is approximately 40 additional available OFDM symbols for the PBCH transmission).

In one example, within one subframe, the PBCH can be rate matched to all REs, and another subframe can be a repetition of the PBCH within the first subframe. Alternatively, the PBCH can be generated based on 6 symbols, as in the legacy MF1.0 system, and can be repeated to the every 6 PBCH symbols, and can be punctured/rate-matched to the fractional 6 symbols.

Figure 11A:
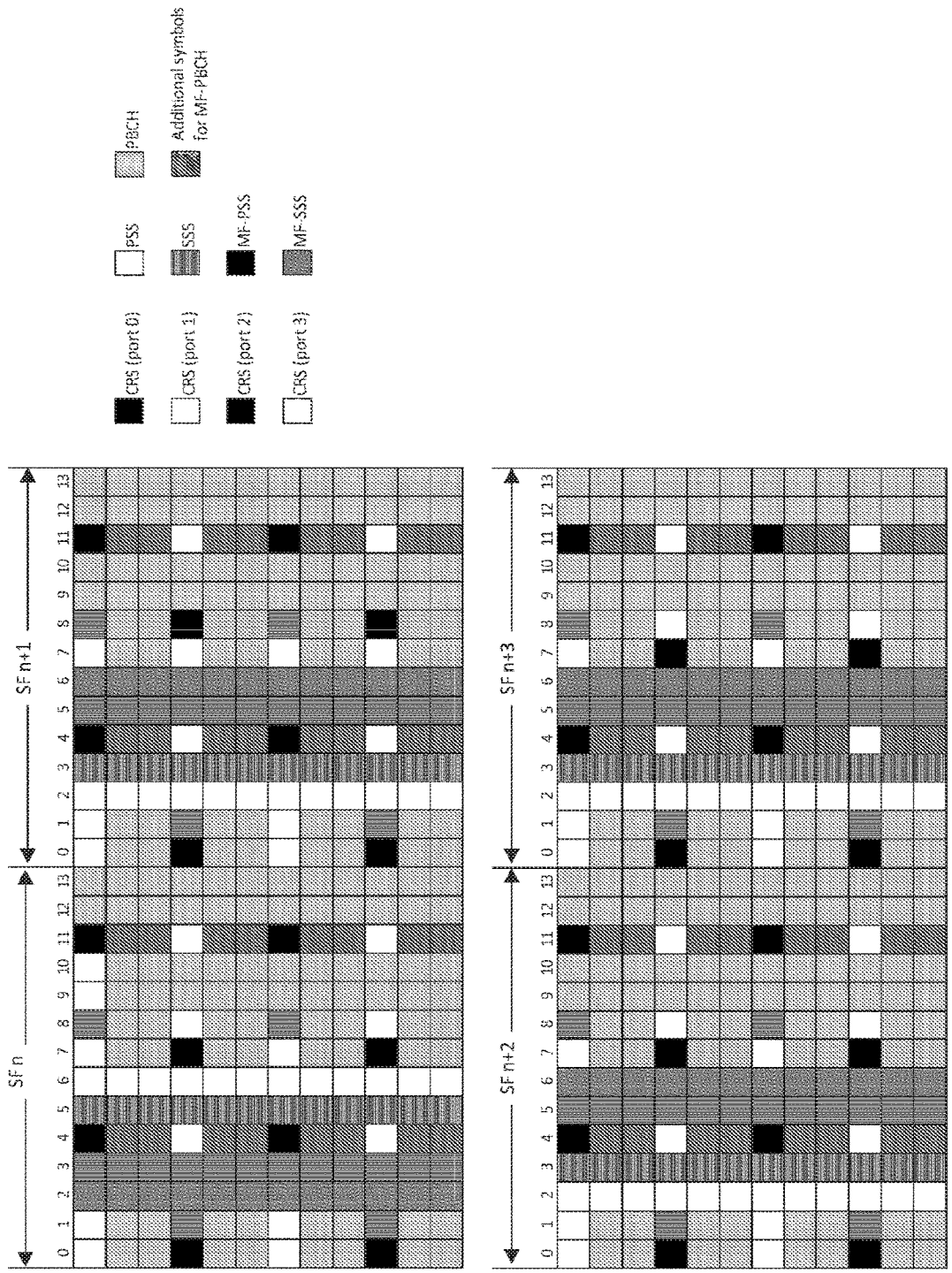
FIGS. 11A and 11B illustrate a PSS/SSS/PBCH transmission in accordance with an example.
Figure 11B:
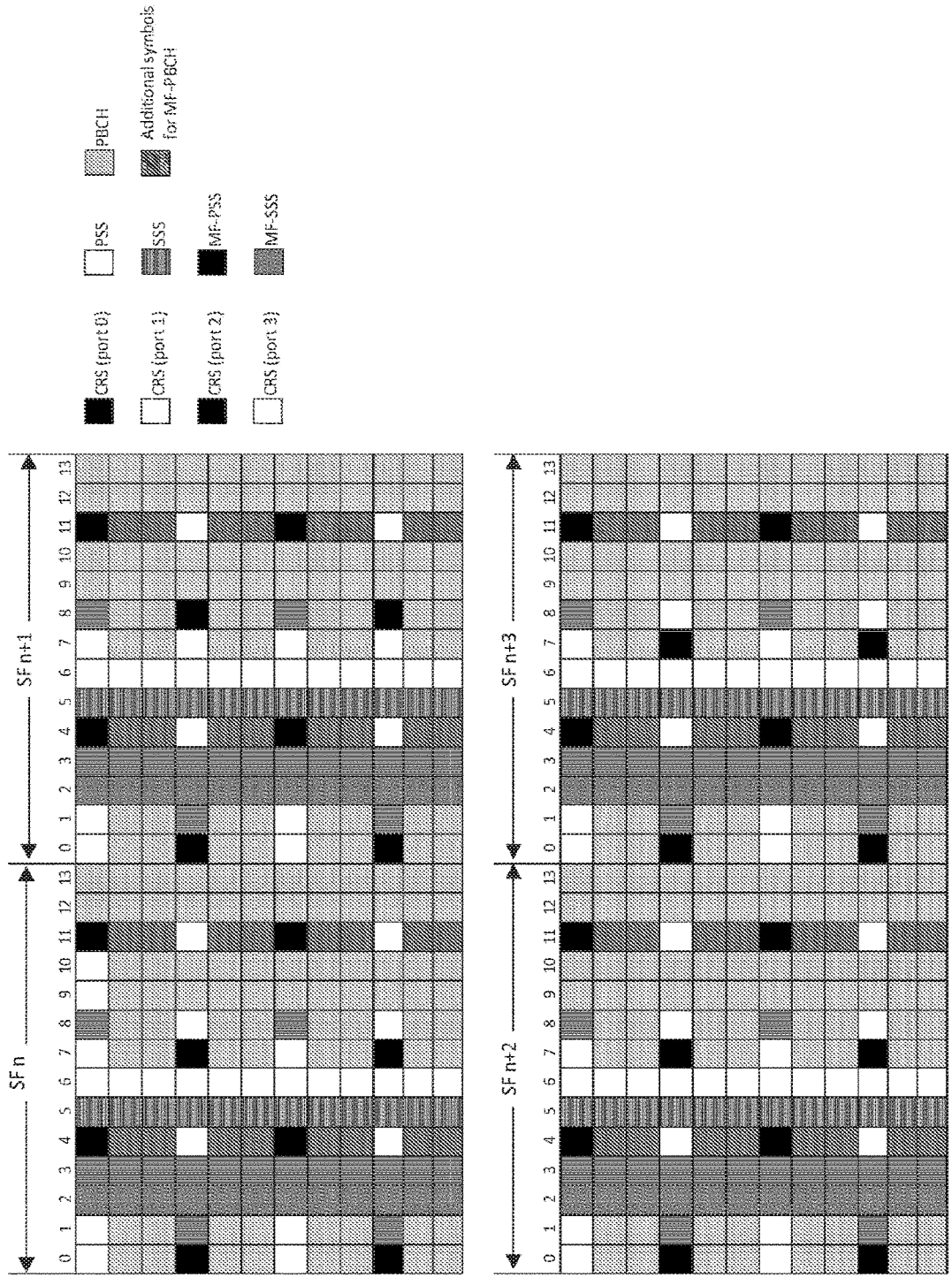

FIGS. 11A and 11B illustrate an example of a PSS/SSS/PBCH transmission. As shown in a first example, a position of the PSS/SSS and MF-PSS/SSS can be interleaved. As shown in a second example, an OCC sequence can be applied to each PSS repetition. In these two examples, in addition to the REs for the CRS/PSS/SSS/MF-PSS/MF-SSS, the remaining REs can be utilized for the PBCH transmission, e.g., the OFDM symbol #0/#1 of the first subframe.

Figure 11C:
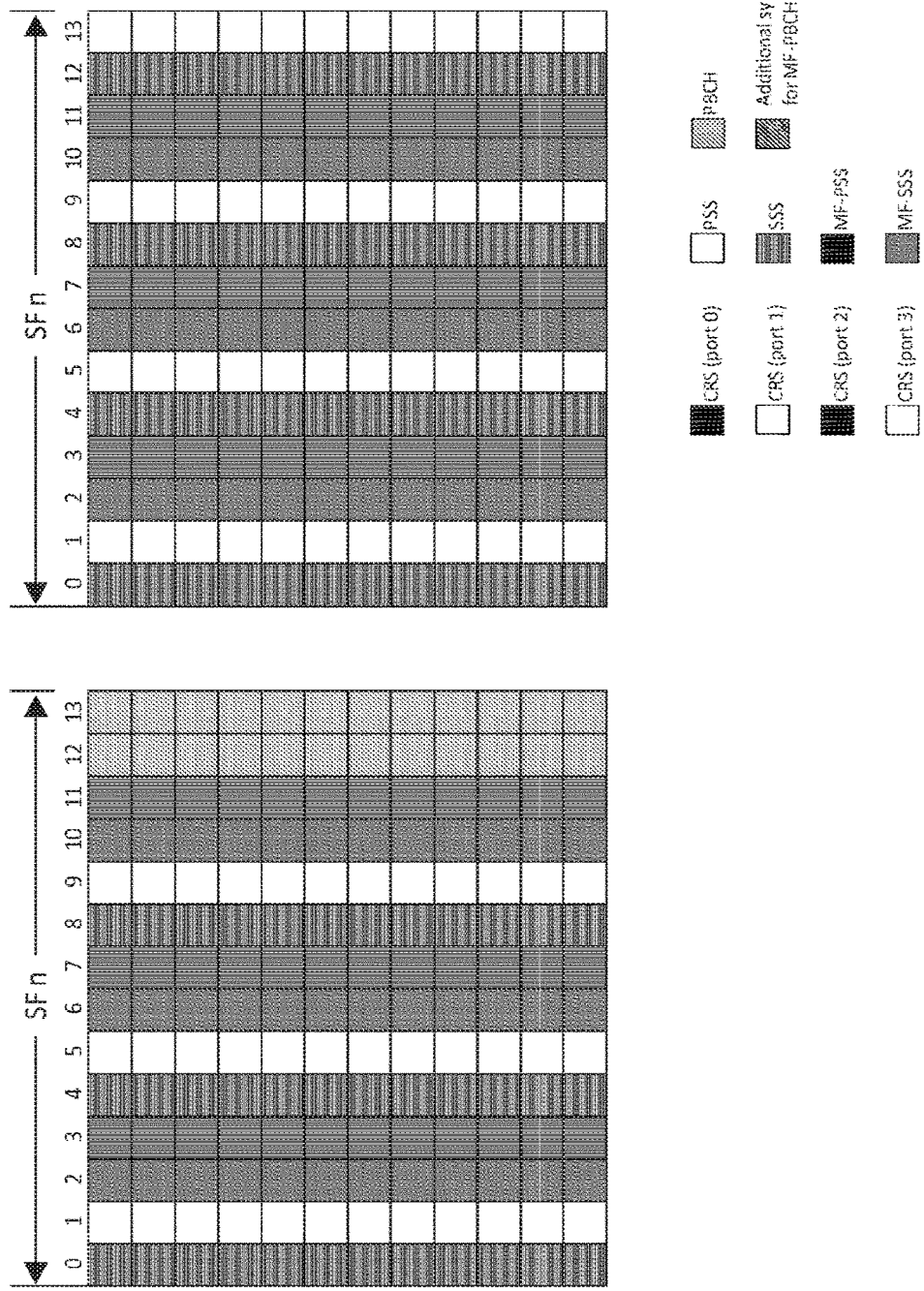
FIGS. 11C, 11D and 11E illustrate a dedicated subframe for a synchronous signal transmission in accordance with an example.
Figure 11D:
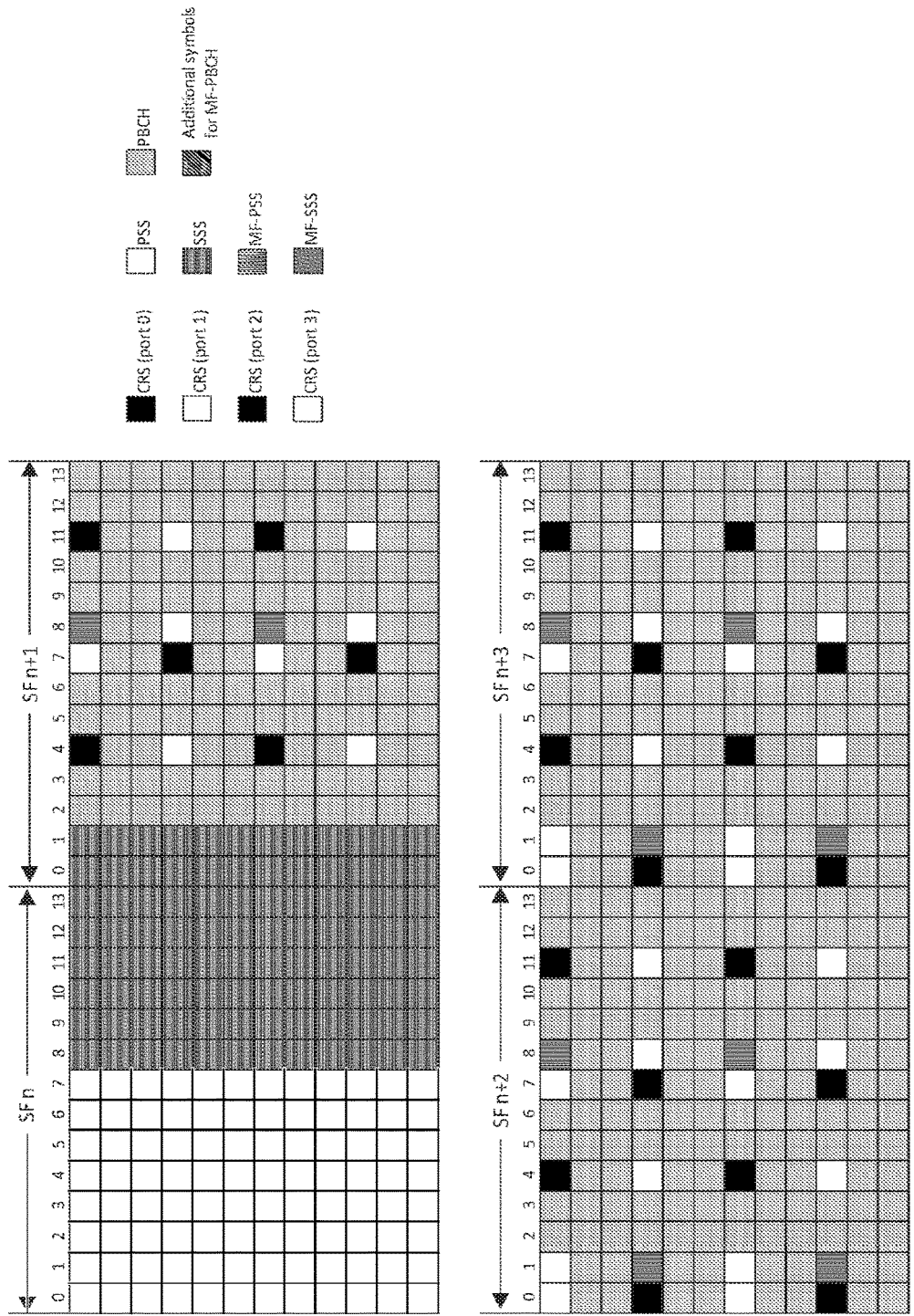
Figure 11E:
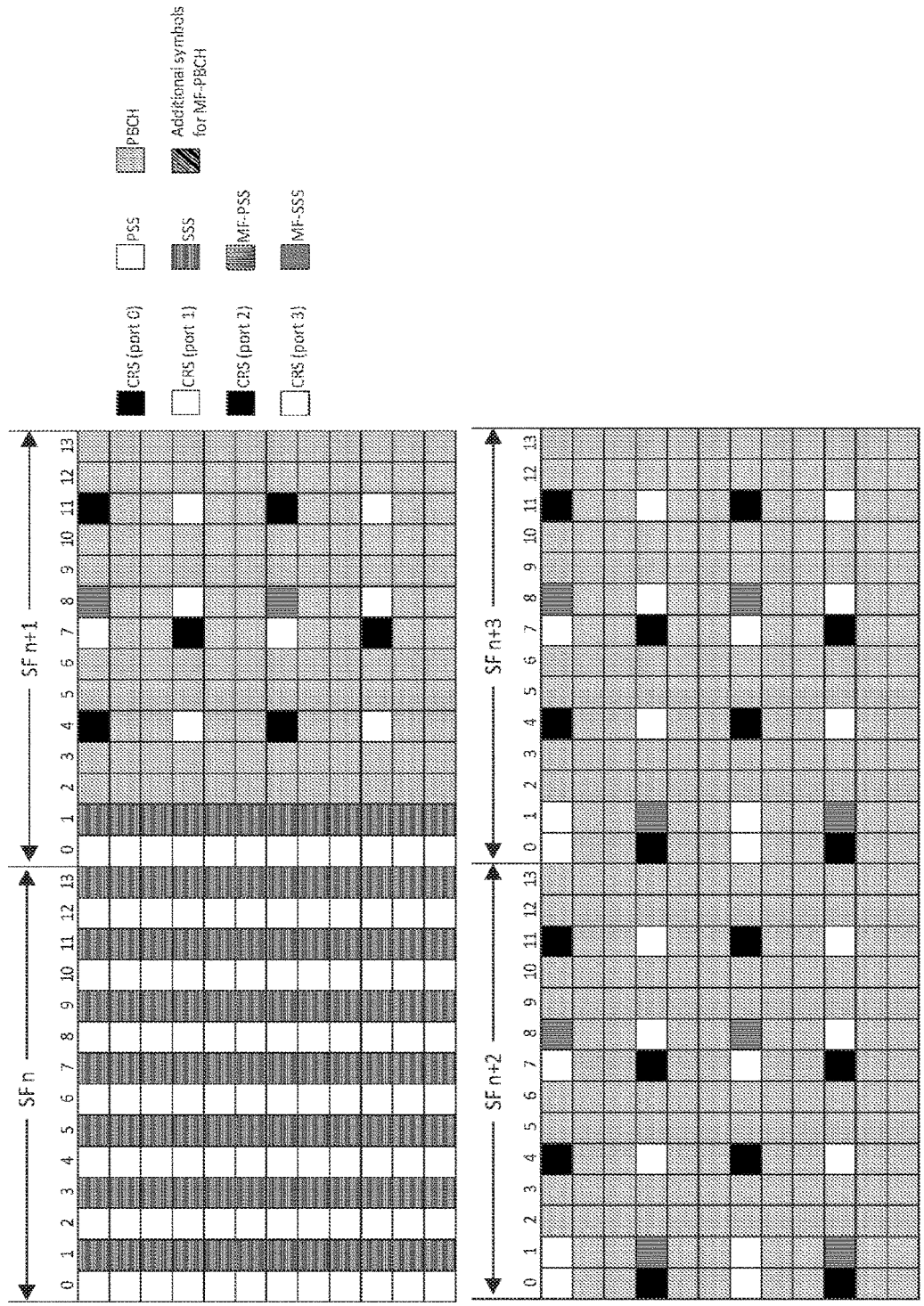

FIGS. 11C, 11D and 11E illustrate an example of a dedicated subframe for a synchronous signal transmission. The dedicated subframe can be for a PSS/SSS/PBCH transmission. In addition, the dedicated subframe can include MF-PSS/SSS.

In one configuration, content within the PBCH can include one or multiple elements, such as: a system frame number (SFB), a system bandwidth, a physical random access channel (PRACH) configuration, physical hybrid-ARQ indicator channel (PHICH) information, an index of a next channel, a subframe offset, a SIB-MF flag change, a transport block size (TB S) for SIB-MF-BR, repetition times of the SIB-MF-BR, and/or a white channel list.

In one example, the content within the PBCH can include the SFN, which can be either 8 bits or can be reduced, e.g., 7 bits when a minimum returning time is 80 ms. The SFN can be a few bits when a larger PBCH period is adopted.

In one example, the content within the PBCH can include the system bandwidth, which can be reduced to a few bits. For instance, the system bandwidth can be 1 bit where "0" is for 1.4 MHz, and "1" is for 5 MHz. Alternatively, the system bandwidth can be 2 bits, where "00" is for 1.4 MHz, "01" is for 5 MHz, "10" is for 10 MHz, and "11" is for 20 MHz.

In one example, the content within the PBCH can include the PRACH configuration, which can include a bit field that is maintained as the legacy LTE system, or can be reduced in size.

In one example, the content within the PBCH can include the PHICH information, which can be maintained as in LTE, or can be reduced in size.

In one example, the content within the PBCH can include the index of the next channel, e.g., for SIB-MF1 and paging. This field can be 4, 5 or 6 bits to support up to 16, 32 or 64 channels, respectively. This field may not be updated frequently, and can maintain a same period as that of a channel list updating.

In one example, the content within the PBCH can include the subframe offset. In the legacy MF 1.0 system, 3 bits can be used to indicate a subframe offset within one DRS period. However, a maximum enhanced clear channel assessment (eCCA) period can be equal to 0.05 multiplied by a maximum channel occupancy time (MCOT), which can actually be limited and conditioned by a starting position of the DRS. Here, this bit field may not be longer, since the DRS can only be transmitted at a fixed subframe. Alternatively, the subframe offset can be extended to more bits.

In one example, the content within the PBCH can include the SIB-MF flag change, e.g., 1 bit to indicate whether the SIB-MF is changed or not. For example, a "1" can indicate a change, and a "0" can indicate a non-change. Alternatively, a bit field toggle can be utilized to indicate whether the SIB-MF has changed or not.

In one example, the content within the PBCH can include the TBS for SIB-MF-BR. For example, three bits can be used to indicate the TBS from a set {208, 256, 328, 504, 712, 936}, as in legacy eMTC.

In one example, the content within the PBCH can include the repetition times of the SIB-MF-BR, e.g., {4, 6, 8, 16}. For example, a joint indicator can be utilized to indicate the TBS and the time repetitions of SIB-MF-BR.

In one example, the content within the PBCH can include the white channel list. For example, a multiple channel hopping pattern can be pre-defined, and an indicator can be utilized to inform which pre-defined pattern is utilized. Alternatively, the repetition times may not be indicated by the PBCH. The UE can derive the subframe by decoding the PBCH, and a remaining subframe can be derived by a dwell time minus the PSS minus the SSS minus the PBCH (i.e., dwell time-PSS-SSS-PBCH).

In one configuration, with respect to a SIB transmission, the SIB can be transmitted on the anchor channel. A periodicity of the SIB can be aligned with the PSS/SSS/PBCH, and can be transmitted following the PBCH. In one example, the SIB-MF-BR can be transmitted without an MPDCCH, while the TBS and/or repetition can be configured by a master information block (MIB), or can be transmitted not on a same dwell time as the PSS/SSS/PBCH. In another example, the SIB-MF-BR transmission can be extended to a paging transmission.

In one configuration, the SIB-MF-BR can be transmitted on a data channel, with a longer periodicity as compared to the PSS/SSS/PBCH. In this case, the UE can read the PBCH every time on the anchor channel, even after a correct PBCH decoding, to obtain SIB-MF scheduling information. Alternatively, a certain duration can be predefined/configured, within which the UE can assume no change of the SIB-MF scheduling information. In other words, the UE may not re-acquire the PBCH for SIB-MF scheduling information within this duration.

FIG. 12A illustrates an example of SIB-MF/paging on an anchor channel. Here, the periodicity of the SIB can be aligned with the PSS/SSS/PBCH, and can be transmitted following the PBCH. In one example, the SIB-MF-BR can be transmitted without an MPDCCH, or can be transmitted not on a same dwell time as the PSS/SSS/PBCH. In another example, the SIB-MF-BR transmission can be extended to the paging transmission.

Figure 12B:
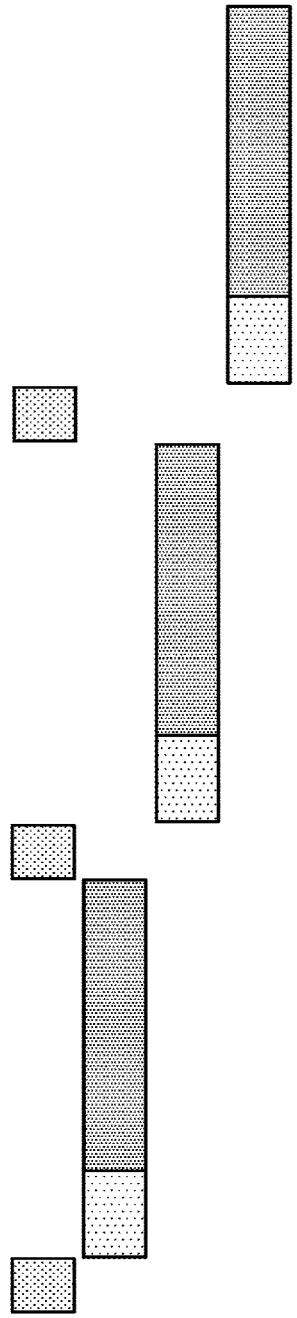
FIG. 12B illustrates SIB-MF/paging on a data channel in accordance with an example.
Figure 12C:
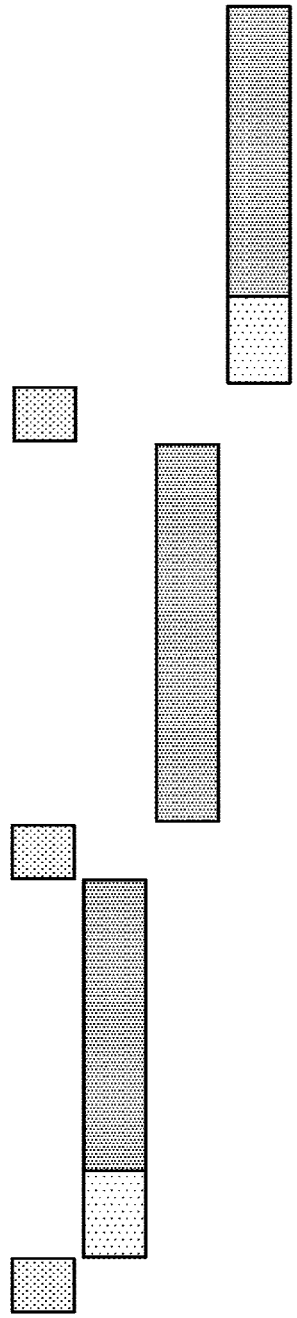
FIG. 12C illustrates SIB-MF/paging on a data channel in accordance with an example.
Figure 13A:
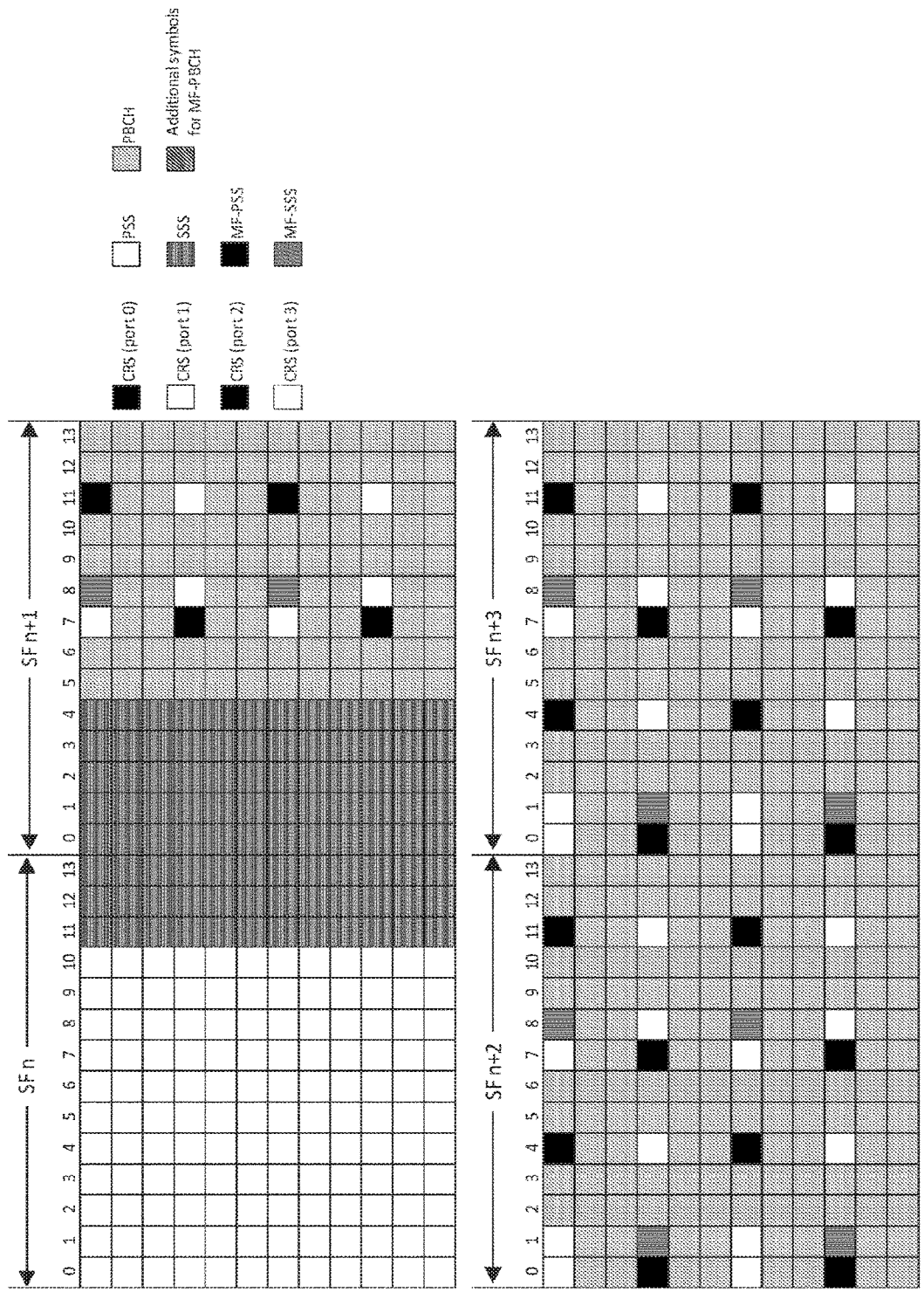
FIGS. 13A, 13B, 13C and 13D illustrate a DRS design with a gap for channel switching and clear channel assessment (CCA) in accordance with an example.
Figure 13B:
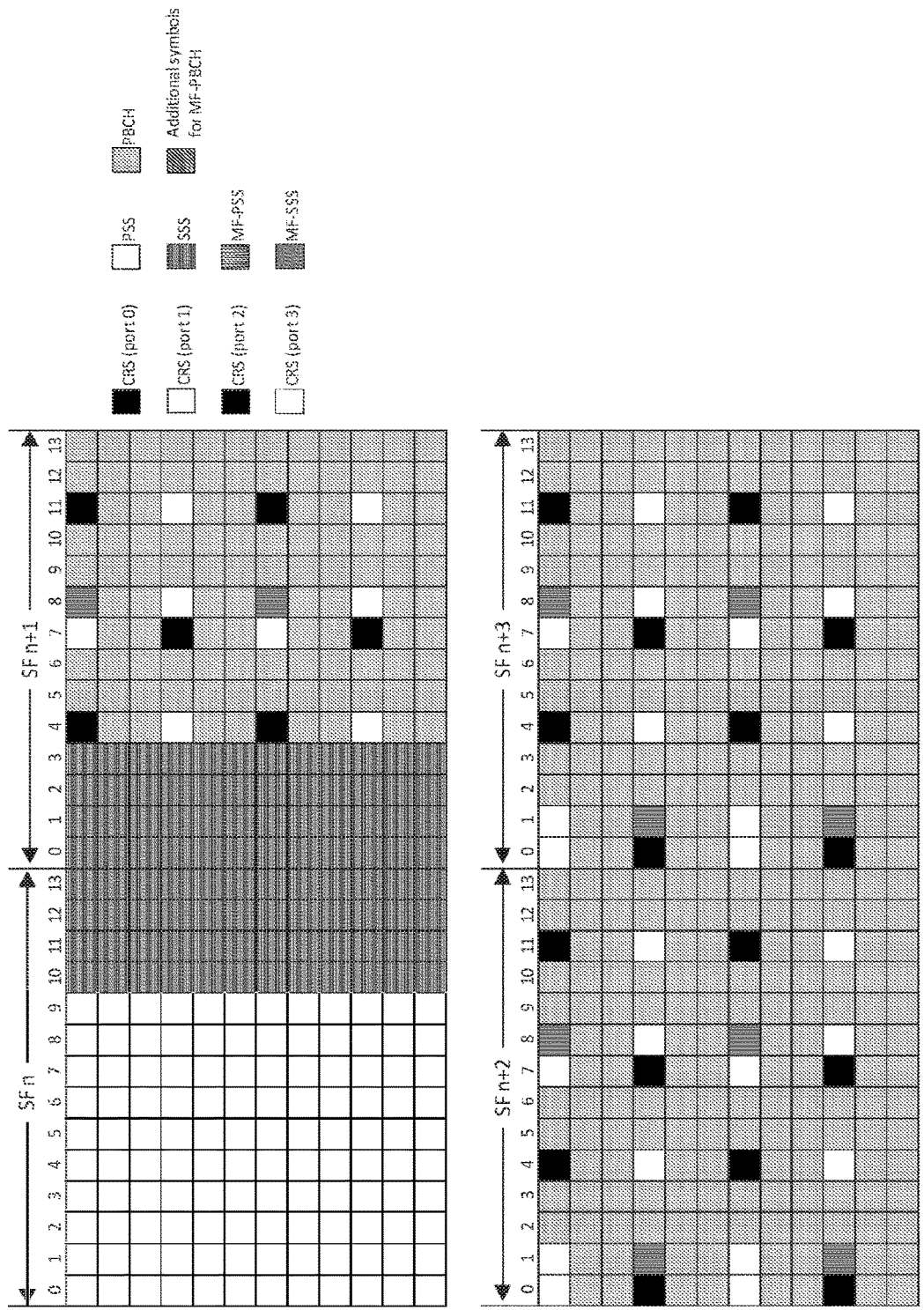
Figure 13C:
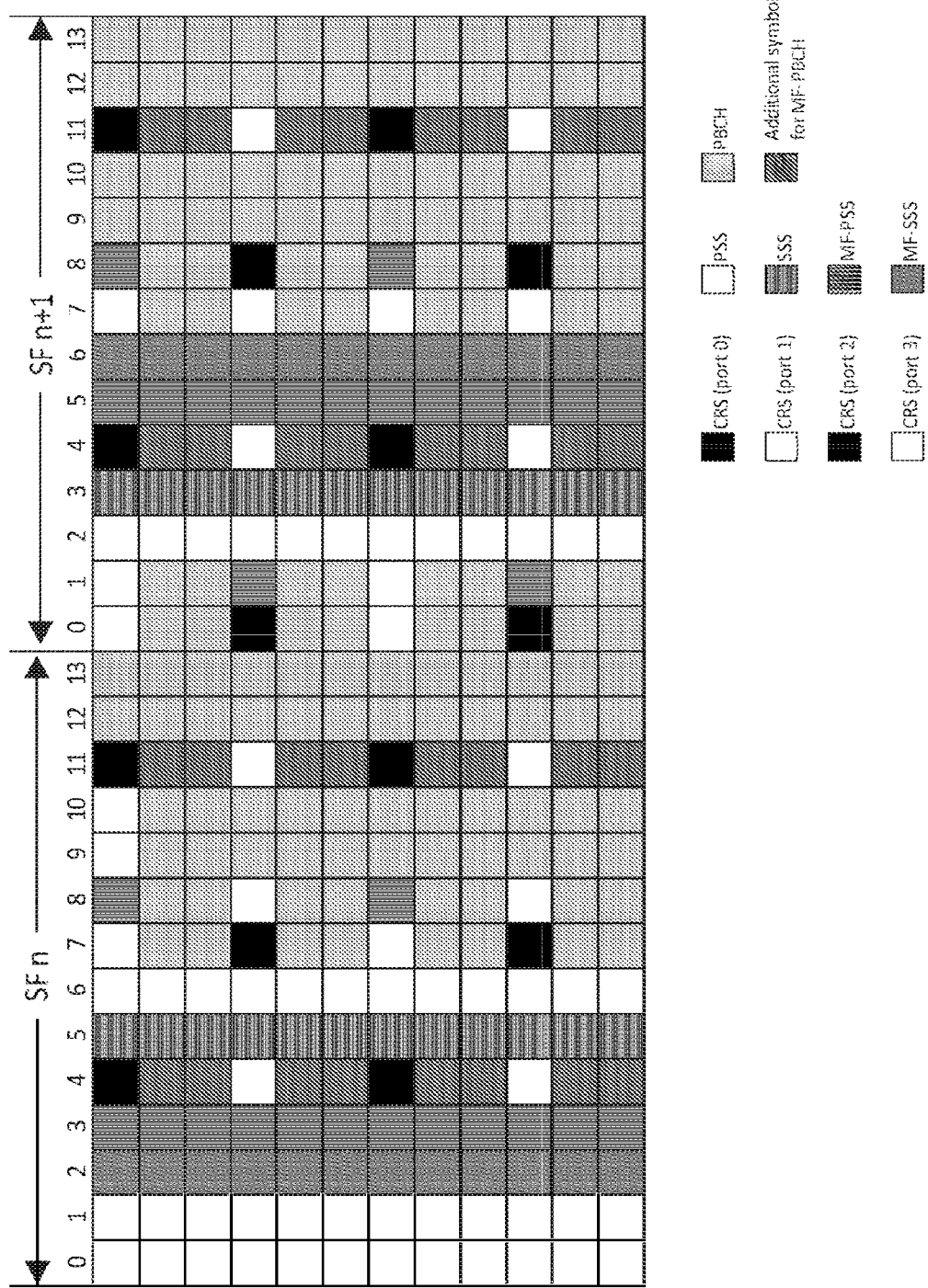
Figure 13D:
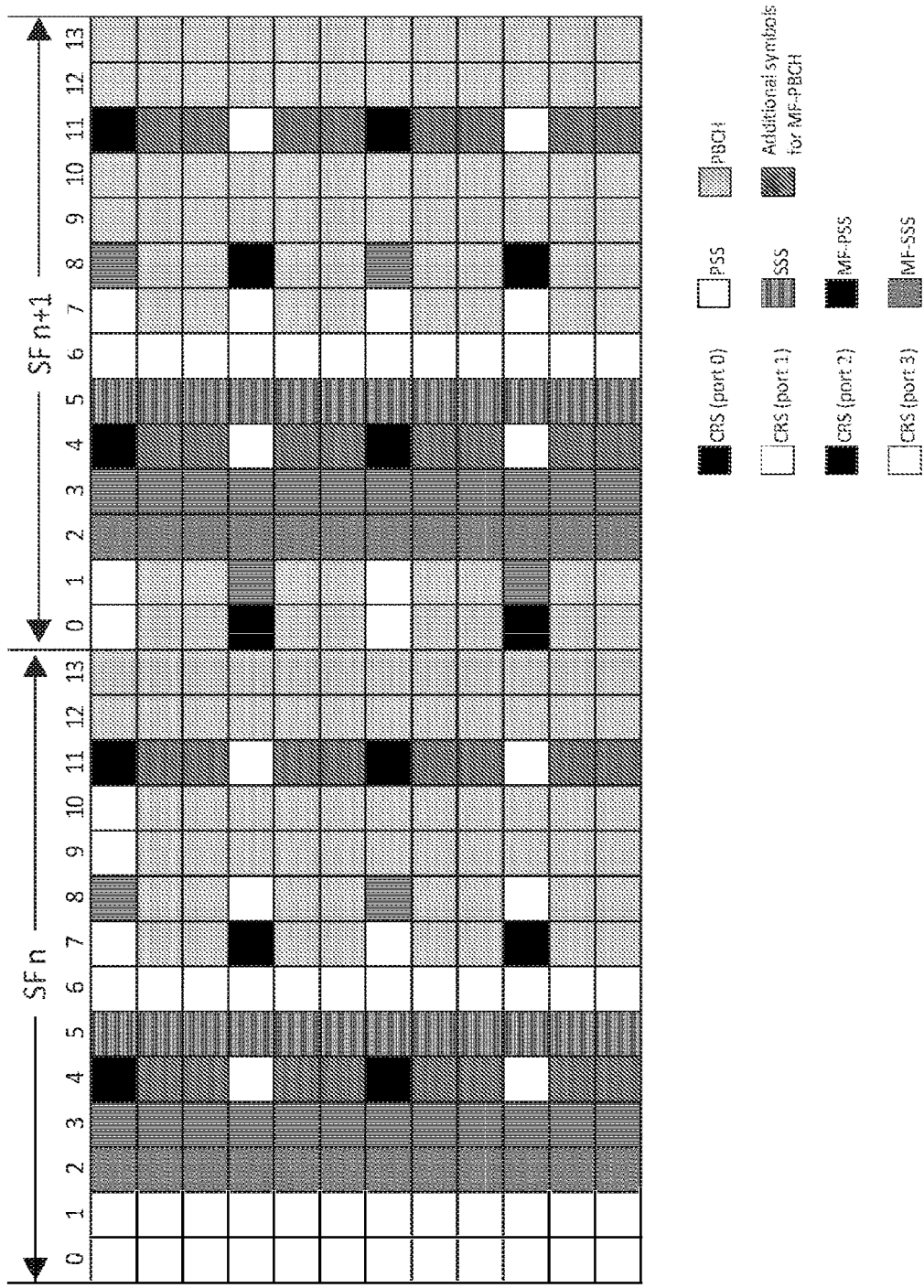

FIGS. 12B and 12C illustrate examples of SIB-MF/paging on a data channel. In FIG. 12B, the SIB-MF/paging can occur on the data channel with a same periodicity as a DRS. In FIG. 12C, the SIB-MF/paging can occur on the data channel with a longer periodicity as the DRS. In one example, a SIB-MF-BR can be transmitted on the data channel, with a longer periodicity as compared to a PSS/SSS/PBCH.

In one configuration, with respect to a timing alignment, a dwell time of an anchor channel can be fixed, while a start time of a DRS can be floating due to listen-before-talk (LBT). In one example, a single clear channel assessment (CCA) can be enabled, where a time can range from 20 microseconds (us) to 40 us to support a 20 ms dwell time of the anchor channel. Either 2/3/4 OFDM symbols can be reserved for RF retuning and LBT. For example, two OFDM symbols can be reserved for RF retuning, and one OFDM symbol can be reserved for CCA LBT. Alternatively, when the UE has strong capacity, two OFDM symbols can be reserved for both RF retuning and CCA LBT. In addition, for a first DRS subframe, beginning 2/3/4 OFDM symbols can be punctured. Alternatively, all the PSS/SSS/PBCH can be shifted 2/3/4 OFDM symbols. Here, last OFDM symbols of a last subframe on the anchor channel can be punctured.

FIGS. 13A, 13B, 13C and 13D illustrate an exemplary DRS design with a gap for channel switching and CCA. For a first DRS subframe, beginning 2/3/4 OFDM symbols can be punctured. Alternatively, all the PSS/SSS/PBCH can be shifted 2/3/4 OFDM symbols. For example, last OFDM symbols of a last subframe on the anchor channel can be punctured.

In one configuration, CCA and one or multiple eCCA can be supported. The eCCA can be successful at any OFDM boundary. For example, an eNodeB can transmit a presence signal, or a cyclic prefix (CP) extension to a slot/subframe/OFDM boundary, and can start the PSS/SSS/PBCH transmission. The presence signal can be a multiple repeated PSS sequence with/without an OCC, or other meaningless sequence. An OFDM boundary can be the OFDM symbol containing a CRS. In addition, to align with an OFDM/slot/PBCH boundary, beginning OFDM symbols of a first valid subframe can be punctured. Alternatively, content of the PSS/SSS/PBCH can be flexibly shifted to align the PBCH boundary.

In one example, when the content of PSS/SSS/PBCH is dynamically shifted, PSS repetition times and a corresponding OCC can be fixed to reduce UE complexity. The UE can detect a subframe boundary in a number of manners. For example, the UE can detect the subframe boundary by the number of repeated SSS, e.g., 8 symbols for a subframe boundary and 9 symbols for a slot boundary. In another example, the UE can detect the subframe boundary by an ending position of SSS, and multiple SSS repetitions (e.g., at least 8 symbols) can be transmitted until the subframe boundary. In yet another example, the UE can detect the subframe boundary by an ending position of PBCH, as well as through CRS detection, where the ending position of the PBCH can be aligned with the subframe boundary.

Figure 14:
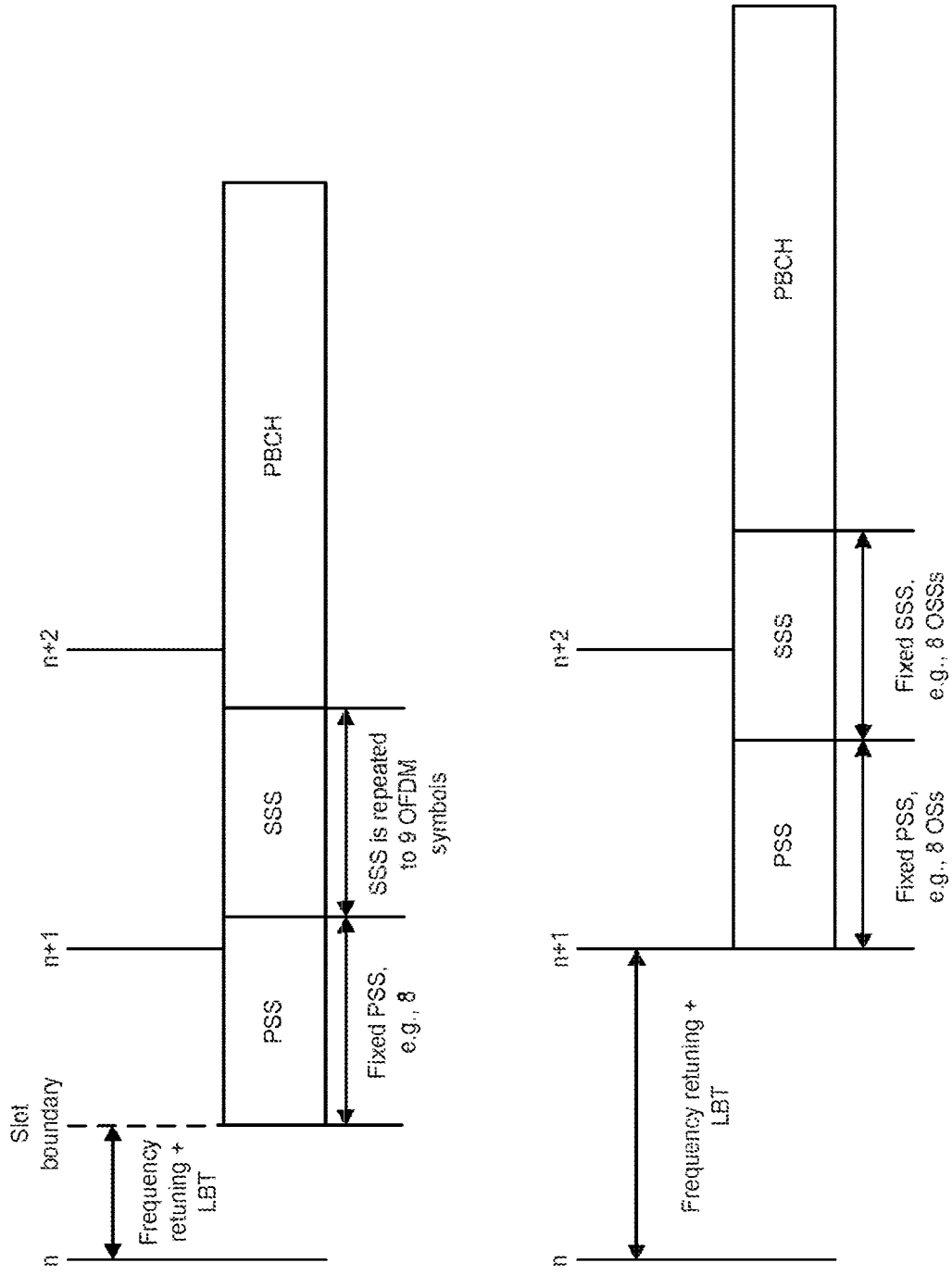
FIG. 14 illustrates a timing alignment in accordance with an example.

FIG. 14 illustrates an example of a timing alignment. For example, in the timing alignment, frequency retuning and LBT can be performed between subframe n and subframe n+1, or alternatively, between subframe n and a slot boundary, which can be in between subframe n and subframe n+1. After the frequency retuning and LBT, PSS, SSS and PBCH transmissions can be performed, respectively, in accordance with the timing alignment.

In one configuration, with respect to content on an anchor channel, one or multiple elements can be contained within one transmission. For instance, one of the following options can be adopted: element 1 can include a PSS and SSS, element 2 can include a PBCH, element 3 can include a MPDCCH and/or a corresponding PDSCH for paging/SIB-MF and element 4 can include a PRS. In one example, one or multiple information/channels can be transmitted within one dwell time on one anchor channel, and these can be transmitted at different times. In another example, the content can be extended to a multiple anchor channel case, e.g., PSS/SSS/PBCH on anchor channel 1, and PDCCH for paging/SIB-MF on the other anchor channel. In yet another example, the PSS/SSS/PBCH can be spanned on every available subframe, e.g., two or four subframes.

In one configuration, to distinguish different subframes when the PSS/SSS/PBCH are all contained in these subframes, a first option or a second option can be employed. In the first option, a first subframe can reuse a legacy DRS structure, where OFDM symbol #2/#3/#5/#6 can be utilized for MF-SSS, MF-PSS, SSS and PSS transmissions, respectively. In subsequent subframes, following the first, a position of the MF-PSS and SSS, and a position of the MF-SSS and PSS can be switched. In the second option, the PSS can be repeated over multiple subframes, and an OCC sequence can be applied to a repeated PSS, with the intent of discerning the PSS repetitions, while the SSS and PBCH can be maintained, e.g., the content and an OFDM position. In addition, the PSS and SSS can be contained in a first subframe, and can be spanned to a second subframe to obtain improved link quality.

In one configuration, one subframe can be dedicated for synchronous signal transmission, and/or remaining OFDM symbols for the PBCH. Subsequently, the PBCH and/or MPDCCH (and/or PDSCH) can be transmitted in following subframes. In a first subframe, there can be x0, x1, y0, y1 OFDM symbols for the PSS, MF-PSS, SSS, and MF-SSS, respectively, and there can be z OFDM symbols for the PBCH. Here, 14≥x0 x1, y0, y1 z 0, and x0+x1+y0+y1+z<=14. For instance, this subframe can contain, e.g., 4/8 PSS OFDMs and 4/8 SSS OFDMs. Alternatively, this subframe can contain 2/4 PSS+2/4 MF PSS, and 2/4 SSS+2/4 MF-SSS. For one synchronous signal, multiple repetitions can be located in contiguous OFDM symbols. Alternatively, different synchronous signals can be located in an interleave fashion manner. The first symbol can start with multiple PSS sequences and subsequent symbols can be for the SSS, or vice versa. For multiple PSS symbols, the OCC can be applied on the multiple PSS symbols to achieve an improved correlation characteristic. In addition, when the PSS/SSS extends to a second subframe, beginning OFDM symbols can be occupied, e.g., 2, 3, 4, or 5.

In one configuration, the PBCH can be transmitted at the anchor channel In addition to the REs for the CRS/PSS/SSS/MF-PSS/MF-SSS, remaining REs can be utilized for a PBCH transmission, e.g., OFDM symbol #0/#1 of a first subframe. When the PSS/SSS are transmitted in initial OFDM symbols of one or two subframes, legacy OFDM symbols in later subframes, e.g., #2/3/5/6, can be utilized for the PBCH transmission (which is approximately 40 additional available OFDM symbols for PBCH transmission). In one example, within one subframe, the PBCH can be rate matched to all REs, and the other subframe can be the repetition of the PBCH within the first subframe. Alternatively, the PBCH can be generated based on 6 symbols as the legacy MF1.0 system, and repeated to the every 6 PBCH symbols, and puncture/rate-matched to the fractional 6 symbols.

In one configuration, content within the PBCH can contain one or multiple elements, as follows:

For example, the content within the PBCH can include a system frame number (SFN), which can be either 8 bits or be reduced, e.g., 7 bits when a minimum returning time is 80 ms. The SFN can be a few bits when a larger PBCH period is adopted.

The content within the PBCH can include a system bandwidth, which can be reduced to a few bits. For instance, 1 bit where "0" for 1.4 MHz, "1" for 5 MHz. Alternatively, 2 bits, where "00" for 1.4 MHz, "01" for 5 MHz, "10" for 10 MHz, "11" for 20 MHz.

The content within the PBCH can include a PRACH configuration, which can include a bit field that is maintained as the legacy LTE system, or can be reduced in size.

The content within the PBCH can include PHICH information, which can be maintained as in LTE, or can be reduced in size.

The content within the PBCH can include an index of a next channel, e.g., for SIB-MF1 and paging. This field can be 4, 5 or 6 bits to support up to 16, 32 or 64 channels, respectively. This field may not be updated frequently, and can maintain a same period as that of a channel list updating.

The content within the PBCH can include a subframe offset. In the legacy MF1.0 system, 3 bits can be used to indicate a subframe offset within one DRS period. However, a maximum eCCA period can be equal to 5%*MCOT, which can actually be limited and conditioned by a starting position of the DRS. Here, this bit field may not be longer, since DRS can only be transmitted at a fixed subframe. Alternatively, the subframe offset can be extended to more bits.

The content within the PBCH can include a SIB-MF flag change, e.g., 1 bit to indicate whether the SIB-MF is changed or not. For example, a "1" can indicate a change, and a "0" can indicate a non-change. Alternatively, a bit field toggle can be utilized to indicate whether the SIB-MF has changed or not.

The content within the PBCH can include a transport block size (TBS) for SIB-MF-BR. For example, three bits can be used to indicate the TBS from a set {208, 256, 328, 504, 712, 936}, as in legacy eMTC.

The content within the PBCH can include repetition times of the SIB-MF-BR, e.g., {4, 6, 8, 16}. For example, a joint indicator can be utilized to indicate the TBS and the time repetitions of SIB-MF-BR.

The content within the PBCH can include a white channel list. For example, a multiple channel hopping pattern can be pre-defined, and an indicator can be utilized to inform which pre-defined pattern is utilized. Alternatively, the repetition times may not be indicated by the PBCH. The UE can derive the subframe by decoding the PBCH, and a remaining subframe can be derived by a dwell time minus the PSS minus the SSS minus the PBCH (i.e., dwell time-PSS-SSS-PBCH).

In one configuration, the SIB can be transmitted on the anchor channel. A periodicity of the SIB can be aligned with the PSS/SSS/PBCH, and this can be transmitted following the PBCH. In one example, the SIB-MF-BR can be transmitted without the MPDCCH, while the TBS and/or repetition can be configured by a MIB, or can be transmitted not on a same dwell time as the PSS/SSS/PBCH.

In one example, the SIB-MF-BR transmission can be extended to a paging transmission.

In one example, the SIB-MF-BR can be transmitted on a data channel, with a longer periodicity as compared to the PSS/SSS/PBCH. In this case, the UE can read the PBCH every time on the anchor channel, even after a correct PBCH decoding, to obtain SIB-MF scheduling information. Alternatively, a certain duration can be predefined/configured, within which the UE can assume no change of the SIB-MF scheduling information. In other words, in this scenario, the UE does not have to re-acquire the PBCH for the SIB-MF scheduling information within this duration.

Another example provides functionality 1500 of a Next Generation NodeB (gNB) operable to communicate over an anchor channel for Unlicensed Internet of Things (U-IoT), as shown in FIG. 15. The gNB can comprise one or more processors configured to encode, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR), as in block 1510. In addition, the gNB can comprise a memory interface configured to retrieve from a memory the control information.

Another example provides at least one machine readable storage medium having instructions 1600 embodied thereon for communicating over an anchor channel for Unlicensed Internet of Things (U-IoT), as shown in FIG. 16. The instructions can be executed on a machine, where the instructions are included on at least one computer readable medium or one non-transitory machine readable storage medium. The instructions when executed by one or more processors of a Next Generation NodeB (gNB) perform: encoding, at the gNB, control information for periodic transmission on an anchor channel having a set frequency for U-IoT in an adaptive frequency hopping system, wherein the anchor channel comprises: a clear channel assessment (CCA) period; an extended CCA (eCCA) period when a failure occurs during the CCA period; a tuning period for radio frequency (RF) retuning with frequency hopping; and a control information communication period for communication of the control information, as in block 1610.

Another example provides at least one machine readable storage medium having instructions 1700 embodied thereon for communicating over an anchor channel for Unlicensed Internet of Things (U-IoT), as shown in FIG. 17. The instructions can be executed on a machine, where the instructions are included on at least one computer readable medium or one non-transitory machine readable storage medium. The instructions when executed by one or more processors of a Next Generation NodeB (gNB) perform:

encoding, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR), as in block 1710.

Figure 18:
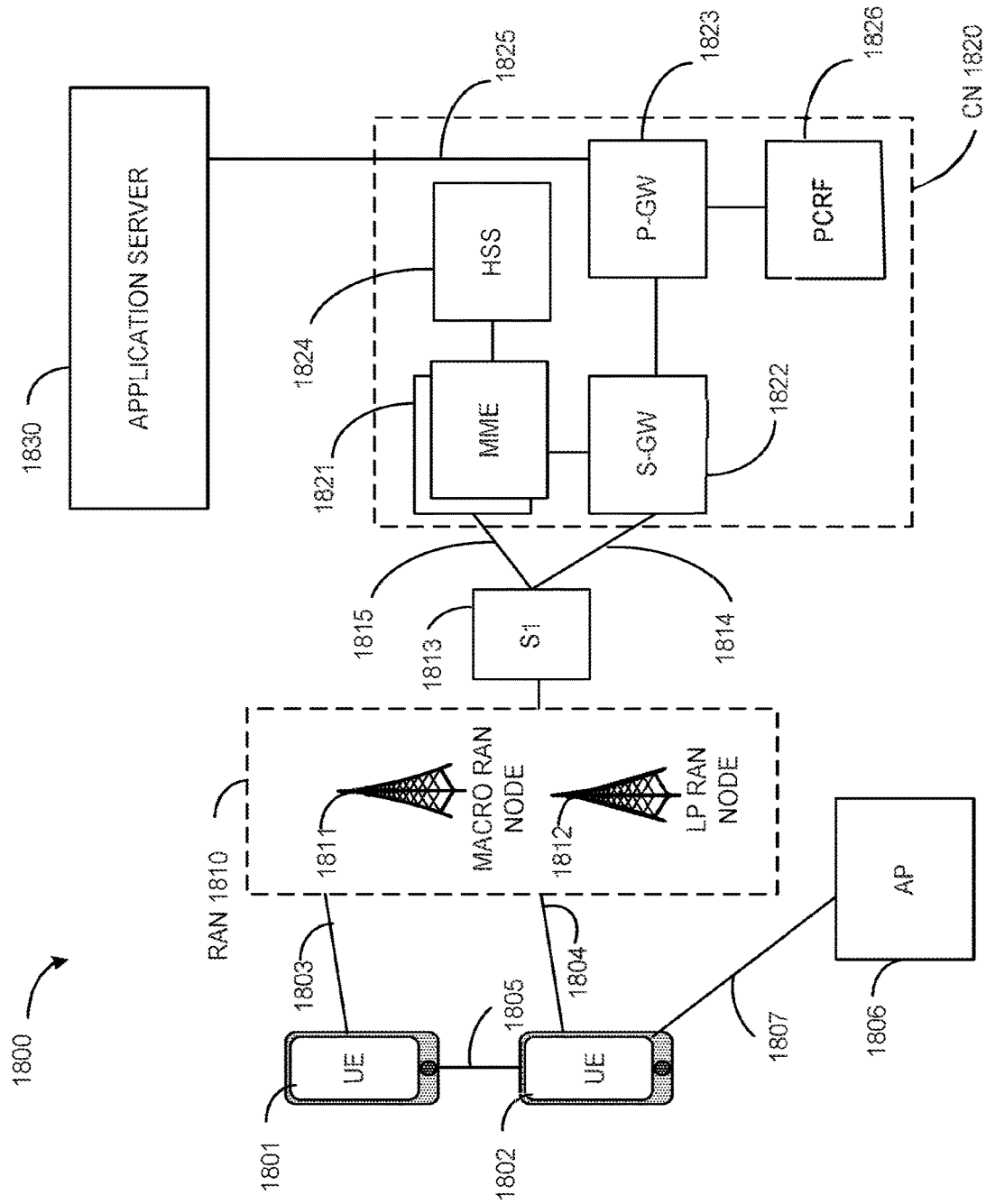
FIG. 18 illustrates an architecture of a wireless network in accordance with an example.

FIG. 18 illustrates an architecture of a system 1800 of a network in accordance with some embodiments. The system 1800 is shown to include a user equipment (UE) 1801 and a UE 1802. The UEs 1801 and 1802 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1801 and 1802 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1801 and 1802 may be configured to connect, e.g., communicatively couple, with a radio access network (RAN) 1810—the RAN 1810 may be, for example, an Evolved Universal Mobile Telecommunications System (UMTS) Terrestrial Radio Access Network (E-UTRAN), a NextGen RAN (NG RAN), or some other type of RAN. The UEs 1801 and 1802 utilize connections 1803 and 1804, respectively, each of which comprises a physical communications interface or layer (discussed in further detail below); in this example, the connections 1803 and 1804 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1801 and 1802 may further directly exchange communication data via a ProSe interface 1805. The ProSe interface 1805 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1802 is shown to be configured to access an access point (AP) 1806 via connection 1807. The connection 1807 can comprise a local wireless connection, such as a connection consistent with any IEEE 1902.15 protocol, wherein the AP 1806 would comprise a wireless fidelity (WiFi®) router. In this example, the AP 1806 is shown to be connected to the Internet without connecting to the core network of the wireless system (described in further detail below).

The RAN 1810 can include one or more access nodes that enable the connections 1803 and 1804. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1810 may include one or more RAN nodes for providing macrocells, e.g., macro RAN node 1811, and one or more RAN nodes for providing femtocells or picocells (e.g., cells having smaller coverage areas, smaller user capacity, or higher bandwidth compared to macrocells), e.g., low power (LP) RAN node 1812.

Any of the RAN nodes 1811 and 1812 can terminate the air interface protocol and can be the first point of contact for the UEs 1801 and 1802. In some embodiments, any of the RAN nodes 1811 and 1812 can fulfill various logical functions for the RAN 1810 including, but not limited to, radio network controller (RNC) functions such as radio bearer management, uplink and downlink dynamic radio resource management and data packet scheduling, and mobility management.

In accordance with some embodiments, the UEs 1801 and 1802 can be configured to communicate using Orthogonal Frequency-Division Multiplexing (OFDM) communication signals with each other or with any of the RAN nodes 1811 and 1812 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1811 and 1812 to the UEs 1801 and 1802, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1801 and 1802. The physical downlink control channel (PDCCH) may carry information about the transport format and resource allocations related to the PDSCH channel, among other things. It may also inform the UEs 1801 and 1802 about the transport format, resource allocation, and H-ARQ (Hybrid Automatic Repeat Request) information related to the uplink shared channel. Typically, downlink scheduling (assigning control and shared channel resource blocks to the UE 1802 within a cell) may be performed at any of the RAN nodes 1811 and 1812 based on channel quality information fed back from any of the UEs 1801 and 1802. The downlink resource assignment information may be sent on the PDCCH used for (e.g., assigned to) each of the UEs 1801 and 1802.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 19).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1810 is shown to be communicatively coupled to a core network (CN) 1820—via an S1 interface 1813. In embodiments, the CN 1820 may be an evolved packet core (EPC) network, a NextGen Packet Core (NPC) network, or some other type of CN. In this embodiment the S1 interface 1813 is split into two parts: the S1-U interface 1814, which carries traffic data between the RAN nodes 1811 and 1812 and the serving gateway (S-GW) 1822, and the S1-mobility management entity (MME) interface 1815, which is a signaling interface between the RAN nodes 1811 and 1812 and MMEs 1821.

In this embodiment, the CN 1820 comprises the MMEs 1821, the S-GW 1822, the Packet Data Network (PDN) Gateway (P-GW) 1823, and a home subscriber server (HSS) 1824. The MMEs 1821 may be similar in function to the control plane of legacy Serving General Packet Radio Service (GPRS) Support Nodes (SGSN). The MMEs 1821 may manage mobility aspects in access such as gateway selection and tracking area list management. The HSS 1824 may comprise a database for network users, including subscription-related information to support the network entities' handling of communication sessions. The CN 1820 may comprise one or several HSSs 1824, depending on the number of mobile subscribers, on the capacity of the equipment, on the organization of the network, etc. For example, the HSS 1824 can provide support for routing/roaming, authentication, authorization, naming/addressing resolution, location dependencies, etc.

The S-GW 1822 may terminate the S1 interface 1813 towards the RAN 1810, and routes data packets between the RAN 1810 and the CN 1820. In addition, the S-GW 1822 may be a local mobility anchor point for inter-RAN node handovers and also may provide an anchor for inter-3GPP mobility. Other responsibilities may include lawful intercept, charging, and some policy enforcement.

The P-GW 1823 may terminate an SGi interface toward a PDN. The P-GW 1823 may route data packets between the EPC network 1823 and external networks such as a network including the application server 1830 (alternatively referred to as application function (AF)) via an Internet Protocol (IP) interface 1825. Generally, the application server 1830 may be an element offering applications that use IP bearer resources with the core network (e.g., UMTS Packet Services (PS) domain, LTE PS data services, etc.). In this embodiment, the P-GW 1823 is shown to be communicatively coupled to an application server 1830 via an IP communications interface 1825. The application server 1830 can also be configured to support one or more communication services (e.g., Voice-over-Internet Protocol (VoIP) sessions, PTT sessions, group communication sessions, social networking services, etc.) for the UEs 1801 and 1802 via the CN 1820.

The P-GW 1823 may further be a node for policy enforcement and charging data collection. Policy and Charging Enforcement Function (PCRF) 1826 is the policy and charging control element of the CN 1820. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1826 may be communicatively coupled to the application server 1830 via the P-GW 1823. The application server 1830 may signal the PCRF 1826 to indicate a new service flow and select the appropriate Quality of Service (QoS) and charging parameters. The PCRF 1826 may provision this rule into a Policy and Charging Enforcement Function (PCEF) (not shown) with the appropriate traffic flow template (TFT) and QoS class of identifier (QCI), which commences the QoS and charging as specified by the application server 1830.

Figure 19:
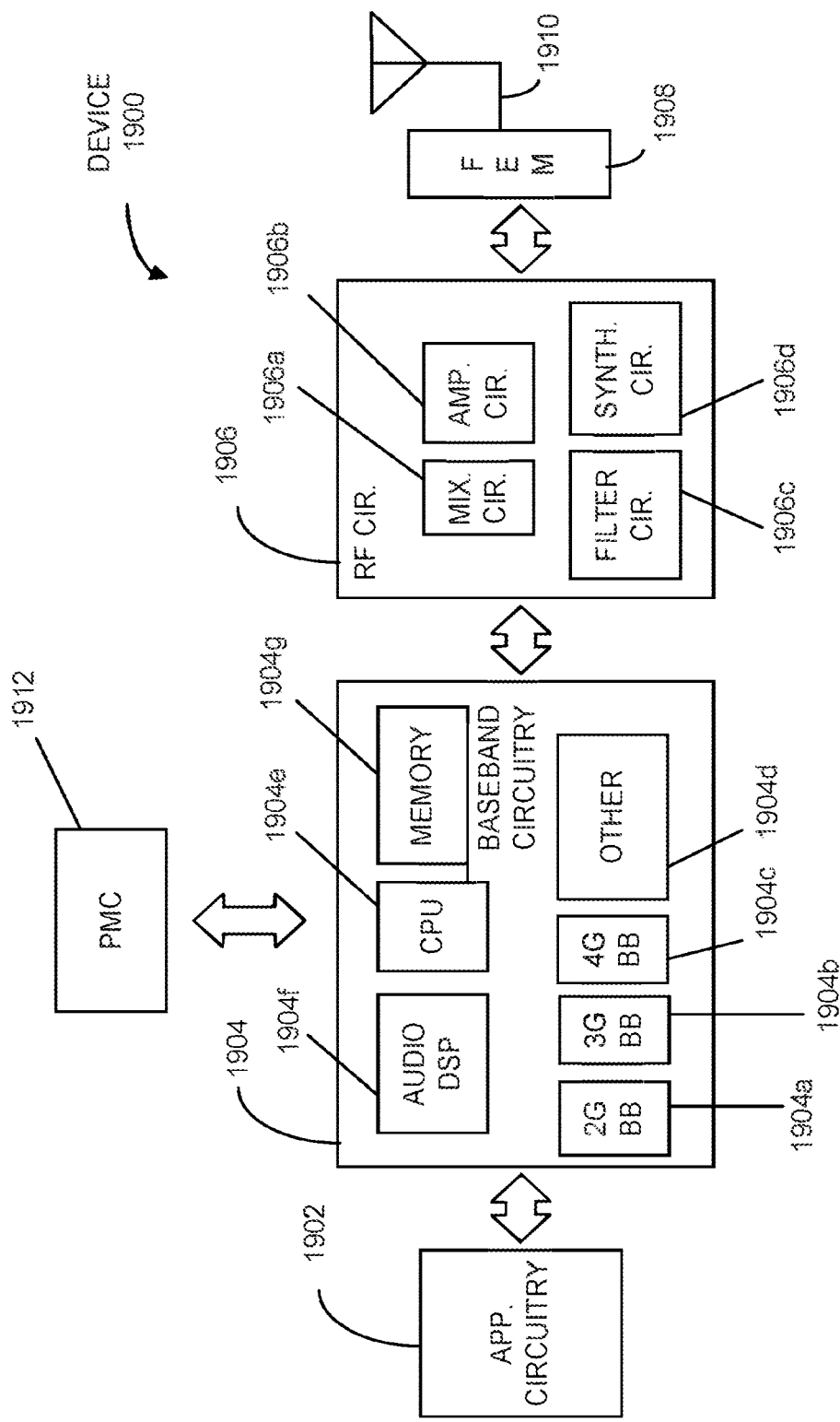
FIG. 19 illustrates a diagram of a wireless device (e.g., UE) in accordance with an example.

FIG. 19 illustrates example components of a device 1900 in accordance with some embodiments. In some embodiments, the device 1900 may include application circuitry 1902, baseband circuitry 1904, Radio Frequency (RF) circuitry 1906, front-end module (FEM) circuitry 1908, one or more antennas 1910, and power management circuitry (PMC) 1912 coupled together at least as shown. The components of the illustrated device 1900 may be included in a UE or a RAN node. In some embodiments, the device 1900 may include less elements (e.g., a RAN node may not utilize application circuitry 1902, and instead include a processor/controller to process IP data received from an EPC). In some embodiments, the device 1900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1902 may include one or more application processors. For example, the application circuitry 1902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1900. In some embodiments, processors of application circuitry 1902 may process IP data packets received from an EPC.

The baseband circuitry 1904 may include circuitry such as, but not limited to, one or more single-core or multi-core processors. The baseband circuitry 1904 may include one or more baseband processors or control logic to process baseband signals received from a receive signal path of the RF circuitry 1906 and to generate baseband signals for a transmit signal path of the RF circuitry 1906. Baseband circuitry 1904 may interface with the application circuitry 1902 for generation and processing of the baseband signals and for controlling operations of the RF circuitry 1906. For example, in some embodiments, the baseband circuitry 1904 may include a third generation (3G) baseband processor 1904a, a fourth generation (4G) baseband processor 1904b, a fifth generation (5G) baseband processor 1904c, or other baseband processor(s) 1904d for other existing generations, generations in development or to be developed in the future (e.g., second generation (2G), sixth generation (6G), etc.). The baseband circuitry 1904 (e.g., one or more of baseband processors 1904a-d) may handle various radio control functions that enable communication with one or more radio networks via the RF circuitry 1906. In other embodiments, some or all of the functionality of baseband processors 1904a-d may be included in modules stored in the memory 1904g and executed via a Central Processing Unit (CPU) 1904e. The radio control functions may include, but are not limited to, signal modulation/demodulation, encoding/decoding, radio frequency shifting, etc. In some embodiments, modulation/demodulation circuitry of the baseband circuitry 1904 may include Fast-Fourier Transform (FFT), precoding, or constellation mapping/demapping functionality. In some embodiments, encoding/decoding circuitry of the baseband circuitry 1904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1904 may include one or more audio digital signal processor(s) (DSP) 1904f. The audio DSP(s) 1904f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1904 and the application circuitry 1902 may be implemented together such as, for example, on a system on a chip (SOC).

In some embodiments, the baseband circuitry 1904 may provide for communication compatible with one or more radio technologies. For example, in some embodiments, the baseband circuitry 1904 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1904 is configured to support radio communications of more than one wireless protocol may be referred to as multi-mode baseband circuitry.

RF circuitry 1906 may enable communication with wireless networks using modulated electromagnetic radiation through a non-solid medium. In various embodiments, the RF circuitry 1906 may include switches, filters, amplifiers, etc. to facilitate the communication with the wireless network. RF circuitry 1906 may include a receive signal path which may include circuitry to down-convert RF signals received from the FEM circuitry 1908 and provide baseband signals to the baseband circuitry 1904. RF circuitry 1906 may also include a transmit signal path which may include circuitry to up-convert baseband signals provided by the baseband circuitry 1904 and provide RF output signals to the FEM circuitry 1908 for transmission.

In some embodiments, the receive signal path of the RF circuitry 1906 may include mixer circuitry 1906a, amplifier circuitry 1906b and filter circuitry 1906c. In some embodiments, the transmit signal path of the RF circuitry 1906 may include filter circuitry 1906c and mixer circuitry 1906a. RF circuitry 1906 may also include synthesizer circuitry 1906d for synthesizing a frequency for use by the mixer circuitry 1906a of the receive signal path and the transmit signal path. In some embodiments, the mixer circuitry 1906a of the receive signal path may be configured to down-convert RF signals received from the FEM circuitry 1908 based on the synthesized frequency provided by synthesizer circuitry 1906d. The amplifier circuitry 1906b may be configured to amplify the down-converted signals and the filter circuitry 1906c may be a low-pass filter (LPF) or band-pass filter (BPF) configured to remove unwanted signals from the down-converted signals to generate output baseband signals. Output baseband signals may be provided to the baseband circuitry 1904 for further processing. In some embodiments, the output baseband signals may be zero-frequency baseband signals, although this is not a necessity. In some embodiments, mixer circuitry 1906a of the receive signal path may comprise passive mixers, although the scope of the embodiments is not limited in this respect.

In some embodiments, the mixer circuitry 1906a of the transmit signal path may be configured to up-convert input baseband signals based on the synthesized frequency provided by the synthesizer circuitry 1906d to generate RF output signals for the FEM circuitry 1908. The baseband signals may be provided by the baseband circuitry 1904 and may be filtered by filter circuitry 1906c.

In some embodiments, the mixer circuitry 1906a of the receive signal path and the mixer circuitry 1906a of the transmit signal path may include two or more mixers and may be arranged for quadrature downconversion and upconversion, respectively. In some embodiments, the mixer circuitry 1906a of the receive signal path and the mixer circuitry 1906a of the transmit signal path may include two or more mixers and may be arranged for image rejection (e.g., Hartley image rejection). In some embodiments, the mixer circuitry 1906a of the receive signal path and the mixer circuitry 1906a may be arranged for direct downconversion and direct upconversion, respectively. In some embodiments, the mixer circuitry 1906a of the receive signal path and the mixer circuitry 1906a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1906 may include analog-to-digital converter (ADC) and digital-to-analog converter (DAC) circuitry and the baseband circuitry 1904 may include a digital baseband interface to communicate with the RF circuitry 1906.

In some dual-mode embodiments, a separate radio IC circuitry may be provided for processing signals for each spectrum, although the scope of the embodiments is not limited in this respect.

In some embodiments, the synthesizer circuitry 1906d may be a fractional-N synthesizer or a fractional N/N+1 synthesizer, although the scope of the embodiments is not limited in this respect as other types of frequency synthesizers may be suitable. For example, synthesizer circuitry 1906d may be a delta-sigma synthesizer, a frequency multiplier, or a synthesizer comprising a phase-locked loop with a frequency divider.

The synthesizer circuitry 1906d may be configured to synthesize an output frequency for use by the mixer circuitry 1906a of the RF circuitry 1906 based on a frequency input and a divider control input. In some embodiments, the synthesizer circuitry 1906d may be a fractional N/N+1 synthesizer.

In some embodiments, frequency input may be provided by a voltage controlled oscillator (VCO), although that is not a necessity. Divider control input may be provided by either the baseband circuitry 1904 or the application circuitry 1902 depending on the desired output frequency. In some embodiments, a divider control input (e.g., N) may be determined from a look-up table based on a channel indicated by the application circuitry 1902.

Synthesizer circuitry 1906d of the RF circuitry 1906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1906d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1906 may include an IQ/polar converter.

FEM circuitry 1908 may include a receive signal path which may include circuitry configured to operate on RF signals received from one or more antennas 1910, amplify the received signals and provide the amplified versions of the received signals to the RF circuitry 1906 for further processing. FEM circuitry 1908 may also include a transmit signal path which may include circuitry configured to amplify signals for transmission provided by the RF circuitry 1906 for transmission by one or more of the one or more antennas 1910. In various embodiments, the amplification through the transmit or receive signal paths may be done solely in the RF circuitry 1906, solely in the FEM 1908, or in both the RF circuitry 1906 and the FEM 1908.

In some embodiments, the FEM circuitry 1908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1906). The transmit signal path of the FEM circuitry 1908 may include a power amplifier (PA) to amplify input RF signals (e.g., provided by RF circuitry 1906), and one or more filters to generate RF signals for subsequent transmission (e.g., by one or more of the one or more antennas 1910).

In some embodiments, the PMC 1912 may manage power provided to the baseband circuitry 1904. In particular, the PMC 1912 may control power-source selection, voltage scaling, battery charging, or DC-to-DC conversion. The PMC 1912 may often be included when the device 1900 is capable of being powered by a battery, for example, when the device is included in a UE. The PMC 1912 may increase the power conversion efficiency while providing desirable implementation size and heat dissipation characteristics.

While FIG. 19 shows the PMC 1912 coupled only with the baseband circuitry 1904. However, in other embodiments, the PMC 19 12 may be additionally or alternatively coupled with, and perform similar power management operations for, other components such as, but not limited to, application circuitry 1902, RF circuitry 1906, or FEM 1908.

In some embodiments, the PMC 1912 may control, or otherwise be part of, various power saving mechanisms of the device 1900. For example, if the device 1900 is in an RRC_Connected state, where it is still connected to the RAN node as it expects to receive traffic shortly, then it may enter a state known as Discontinuous Reception Mode (DRX) after a period of inactivity. During this state, the device 1900 may power down for brief intervals of time and thus save power.

If there is no data traffic activity for an extended period of time, then the device 1900 may transition off to an RRC_Idle state, where it disconnects from the network and does not perform operations such as channel quality feedback, handover, etc. The device 1900 goes into a very low power state and it performs paging where again it periodically wakes up to listen to the network and then powers down again. The device 1900 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1902 and processors of the baseband circuitry 1904 may be used to execute elements of one or more instances of a protocol stack. For example, processors of the baseband circuitry 1904, alone or in combination, may be used execute Layer 3, Layer 2, or Layer 1 functionality, while processors of the application circuitry 1904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 20:
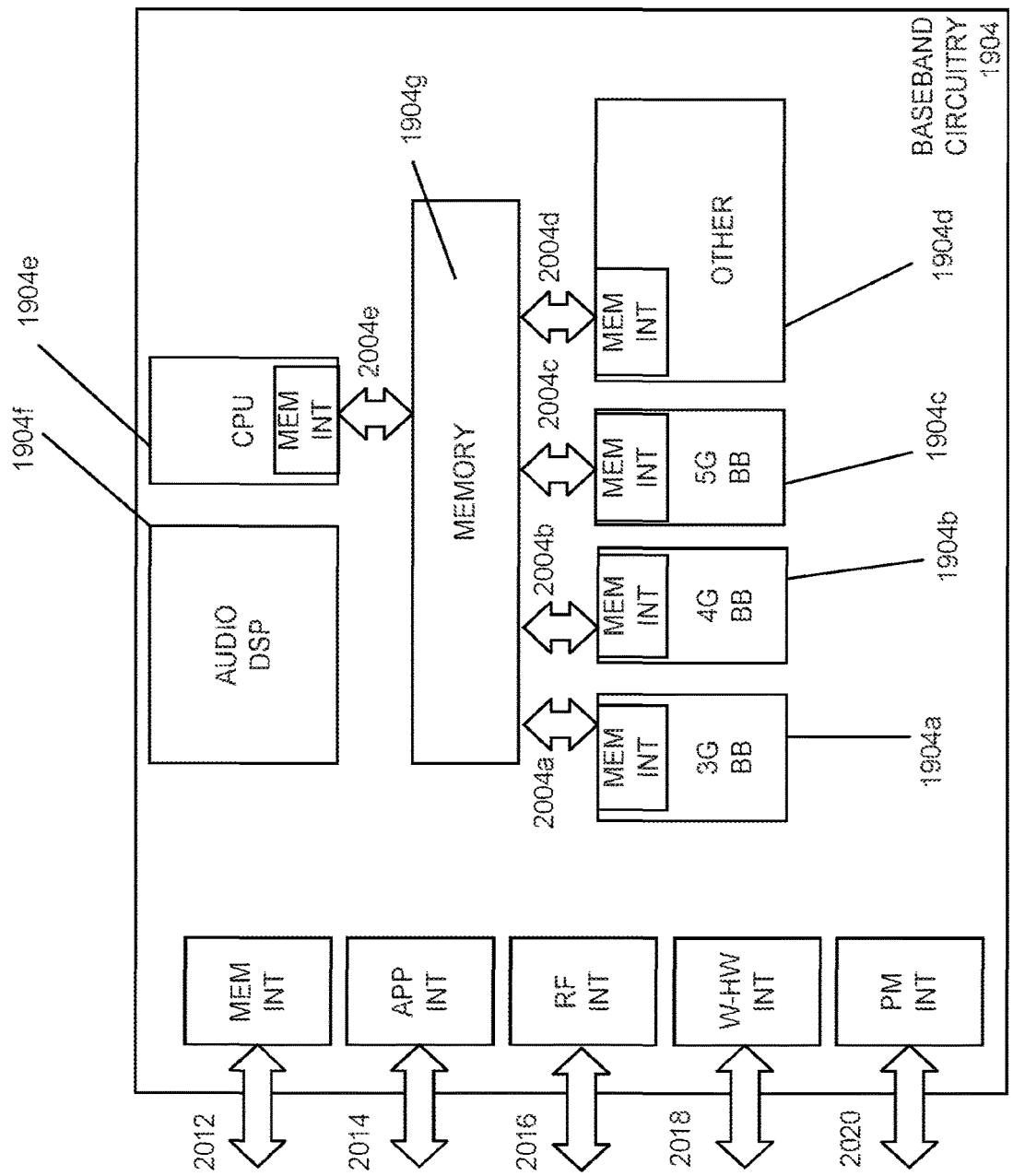
FIG. 20 illustrates interfaces of baseband circuitry in accordance with an example.

FIG. 20 illustrates example interfaces of baseband circuitry in accordance with some embodiments. As discussed above, the baseband circuitry 1904 of FIG. 19 may comprise processors 1904a-1904e and a memory 1904g utilized by said processors. Each of the processors 1904a-1904e may include a memory interface, 2004a-2004e, respectively, to send/receive data to/from the memory 1904g.

The baseband circuitry 1904 may further include one or more interfaces to communicatively couple to other circuitries/devices, such as a memory interface 2012 (e.g., an interface to send/receive data to/from memory external to the baseband circuitry 1904), an application circuitry interface 2014 (e.g., an interface to send/receive data to/from the application circuitry 1902 of FIG. 19), an RF circuitry interface 2016 (e.g., an interface to send/receive data to/from RF circuitry 1906 of FIG. 19), a wireless hardware connectivity interface 2018 (e.g., an interface to send/receive data to/from Near Field Communication (NFC) components, Bluetooth® components (e.g., Bluetooth® Low Energy), Wi-Fi® components, and other communication components), and a power management interface 2020 (e.g., an interface to send/receive power or control signals to/from the PMC 1912.

Figure 21:
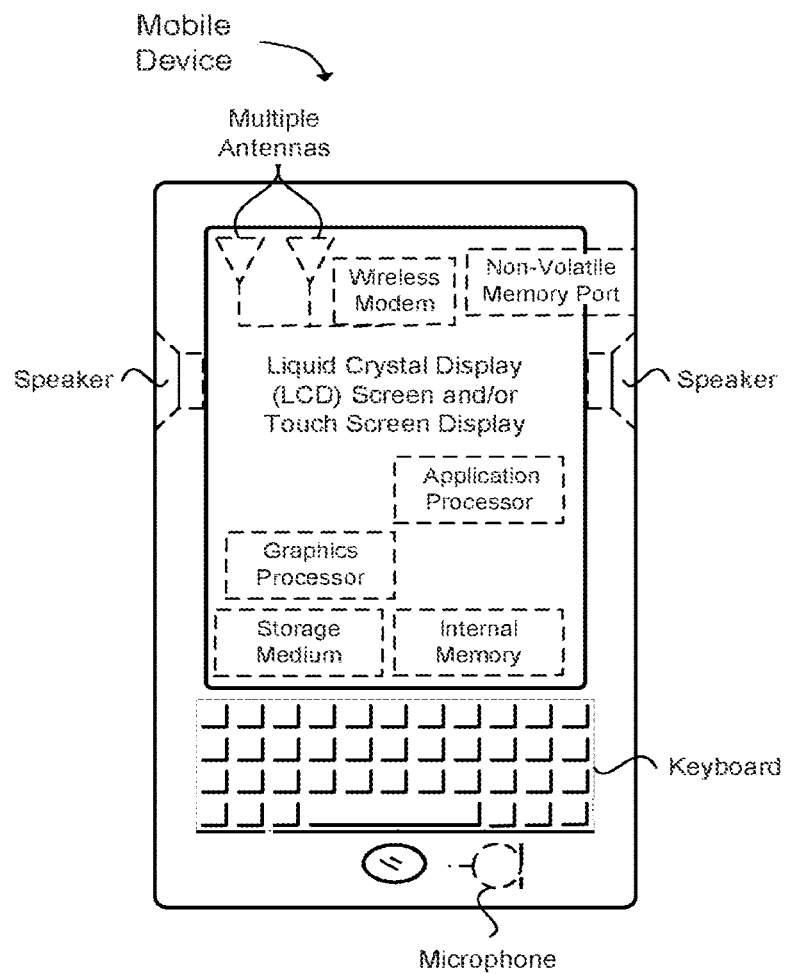
FIG. 21 illustrates a diagram of a wireless device (e.g., UE) in accordance with an example.

FIG. 21 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX®, High Speed Packet Access (HSPA), Bluetooth®, and WiFi®. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 21 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to communicate over an anchor channel for Unlicensed Internet of Things (U-IoT), the apparatus comprising: one or more processors configured to: encode, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR); and a memory interface configured to retrieve from a memory the control information.

Example 2 includes the apparatus of Example 1, further comprising a transceiver configured to transmit the control information to the UE over the anchor channel for U-IoT in the adaptive frequency hopping system.

Example 3 includes the apparatus of any of Examples 1 to 2, wherein the one or more processors are further configured to encode the control information as a single transmission over the anchor channel to the UE.

Example 4 includes the apparatus of any of Examples 1 to 3, wherein: in a first DRS subframe of the two DRS subframes, orthogonal frequency division multiplexing (OFDM) symbol #2 is used for MF-SSS, OFDM symbol #3 is used for MF-PSS, OFDM symbol #5 is used for SSS and OFDM symbol #6 is used for PSS; and in a second DRS subframe of the two DRS subframes, OFDM symbol #2 is used for PSS, OFDM symbol #3 is used for SSS, OFDM symbol #5 is used for MF-PSS and OFDM symbol #6 is used for MF-SSS.

Example 5 includes the apparatus of any of Examples 1 to 4, wherein content within the PBCH includes one or more of: a system frame number (SFN) that is indicated using seven bits; a subframe offset within one DRS period; or SIB-MF-BR scheduling information that includes a transport block size (TBS) for the SIB-MF-BR.

Example 6 includes the apparatus of any of Examples 1 to 5, wherein content within the SIB-MF-BR includes essential information for a random access channel (RACH) procedure.

Example 7 includes the apparatus of any of Examples 1 to 6, wherein a first two orthogonal frequency division multiplexing (OFDM) symbols in a first DRS subframe of the two DRS subframes are reserved for radio frequency (RF) tuning and clear channel assessment (CCA) listen before talk (LBT).

Example 8 includes the apparatus of any of Examples 1 to 7, wherein the one or more processors are configured to delay transmission of the control information for up to one DRS subframe when enhanced clear channel assessment (eCCA) is performed at the gNB.

Example 9 includes the apparatus of any of Examples 1 to 8, wherein the one or more processors are configured to use a pseudo random hopping sequence to hop between different data channels, wherein the pseudo random hopping sequence is specific to the gNB.

Example 10 includes the apparatus of any of Examples 1 to 9, wherein the anchor channel is one of three anchor channels that are defined for the gNB, and the gNB uses only one of the three anchor channels at a given time.

Example 11 includes the apparatus of any of Examples 1 to 10, wherein a dwell time of the anchor channel is less than a dwell time of a data channel used by the gNB, wherein the dwell time of the anchor channel is fixed at 5 milliseconds (ms), and a dwell time of the data channel is fixed at 75 ms.

Example 12 includes at least one machine readable storage medium having instructions embodied thereon for communicating over an anchor channel for Unlicensed Internet of Things (U-IoT), the instructions when executed by one or more processors at a Next Generation NodeB (gNB) perform the following: encoding, at the gNB, control information for periodic transmission on an anchor channel having a set frequency for U-IoT in an adaptive frequency hopping system, wherein the anchor channel comprises: a clear channel assessment (CCA) period; an extended CCA (eCCA) period when a failure occurs during the CCA period; a tuning period for radio frequency (RF) retuning with frequency hopping; and a control information communication period for communication of the control information.

Example 13 includes the at least one machine readable storage medium of Example 12, further comprising instructions when executed perform the following: encoding, at the gNB, data for transmission on one or more data channels with frequency hopping, wherein each data channel comprises: a CCA period; an eCCA period when a failure occurs during the CCA period; a tuning period for RF retuning with frequency hopping; and a downlink/uplink (DL/UL) communication period.

Example 14 includes the at least one machine readable storage medium of any of Examples 12 to 13, wherein the anchor channel for U-IoT in the adaptive frequency hopping system is separate from a data channel with frequency hopping in the adaptive frequency hopping system.

Example 15 includes the at least one machine readable storage medium of any of Examples 12 to 14, wherein the control information for transmission over the anchor channel for U-IoT in the adaptive frequency hopping system includes one or more of: a discovery reference signal (DRS), a physical broadcast channel (PBCH) transmission or essential system information (SI).

Example 16 includes the at least one machine readable storage medium of any of Examples 12 to 15, wherein the control information includes essential SI that spans over multiple frequency hops, wherein a portion of the essential SI is transmitted over the anchor channel for U-IoT in the adaptive frequency hopping system, and a portion of the essential SI is transmitted over a data channel with frequency hopping in the adaptive frequency hopping system.

Example 17 includes the at least one machine readable storage medium of any of Examples 12 to 16, wherein the anchor channel for U-IoT in the adaptive frequency hopping system has a shorter dwell time as compared to a data channel for U-IoT in the adaptive frequency hopping system.

Example 18 includes the at least one machine readable storage medium of any of Examples 12 to 17, wherein the anchor channel for U-IoT in the adaptive frequency hopping system is periodic and occurs at a fixed frequency.

Example 19 includes the at least one machine readable storage medium of any of Examples 12 to 18, further comprising instructions when executed perform the following: performing one or more of a CCA or an eCCA on the anchor channel for U-IoT in the adaptive frequency hopping system.

Example 20 includes the at least one machine readable storage medium of any of Examples 12 to 19, further comprising instructions when executed perform the following: configuring a random access channel (RACH) procedure for the UE on a system information block (SIB) carried on a data channel with frequency hopping in the adaptive frequency hopping system, wherein a random access response (RAR) window during the RACH procedure extends over multiple frequency hops when the RAR window is larger than a defined dwell time.

Example 21 includes the at least one machine readable storage medium of any of Examples 12 to 20, further comprising instructions when executed perform the following: encoding a hopping channel sequence for a non-anchor channel for transmission to the UE over the anchor channel for U-IoT in the adaptive frequency hopping system, wherein the hopping channel sequence is signaled from the gNB to the UE as essential system information (SI).

Example 22 includes at least one machine readable storage medium having instructions embodied thereon for communicating over an anchor channel for Unlicensed Internet of Things (U-IoT), the instructions when executed by one or more processors at a Next Generation NodeB (gNB) perform the following: encoding, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR).

Example 23 includes the at least one machine readable storage medium of Example 22, further comprising instructions when executed perform the following: encoding the control information as a single transmission over the anchor channel to the UE.

Example 24 includes the at least one machine readable storage medium of any of Examples 22 to 23, wherein: in a first DRS subframe of the two DRS subframes, orthogonal frequency division multiplexing (OFDM) symbol #2 is used for MF-SSS, OFDM symbol #3 is used for MF-PSS, OFDM symbol #5 is used for SSS and OFDM symbol #6 is used for PSS; and in a second DRS subframe of the two DRS subframes, OFDM symbol #2 is used for PSS, OFDM symbol #3 is used for SSS, OFDM symbol #5 is used for MF-PSS and OFDM symbol #6 is used for MF-SSS.

Example 25 includes the at least one machine readable storage medium of any of Examples 22 to 24, wherein content within the PBCH includes one or more of: a system frame number (SFN) that is indicated using seven bits; a subframe offset within one DRS period; or SIB-MF-BR scheduling information that includes a transport block size (TBS) for the SIB-MF-BR.

Example 26 includes the at least one machine readable storage medium of any of Examples 22 to 25, wherein content within the SIB-MF-BR includes essential information for a random access channel (RACH) procedure.

Example 27 includes the at least one machine readable storage medium of any of Examples 22 to 26, wherein a first two orthogonal frequency division multiplexing (OFDM) symbols in a first DRS subframe of the two DRS subframes are reserved for radio frequency (RF) tuning and clear channel assessment (CCA) listen before talk (LBT).

Example 28 includes the at least one machine readable storage medium of any of Examples 22 to 27, further comprising instructions when executed perform the following: delaying transmission of the control information for up to one DRS subframe when enhanced clear channel assessment (eCCA) is performed at the gNB.

Example 29 includes the at least one machine readable storage medium of any of Examples 22 to 28, further comprising instructions when executed perform the following: using a pseudo random hopping sequence to hop between different data channels, wherein the pseudo random hopping sequence is specific to the gNB.

Example 30 includes the at least one machine readable storage medium of any of Examples 22 to 29, wherein a dwell time of the anchor channel is less than a dwell time of a data channel used by the gNB, wherein the dwell time of the anchor channel is fixed at 5 milliseconds (ms), and a dwell time of the data channel is fixed at 75 ms.

Example 31 includes a Next Generation NodeB (gNB) operable to communicate over an anchor channel for Unlicensed Internet of Things (U-IoT), the gNB comprising: means for encoding, at the gNB, control information for periodic transmission on an anchor channel having a set frequency for U-IoT in an adaptive frequency hopping system, wherein the anchor channel comprises: a clear channel assessment (CCA) period; an extended CCA (eCCA) period when a failure occurs during the CCA period; a tuning period for radio frequency (RF) retuning with frequency hopping; and a control information communication period for communication of the control information.

Example 32 includes the gNB of Example 31, further comprising: means for encoding, at the gNB, data for transmission on one or more data channels with frequency hopping, wherein each data channel comprises: a CCA period; an eCCA period when a failure occurs during the CCA period; a tuning period for RF retuning with frequency hopping; and a downlink/uplink (DL/UL) communication period.

Example 33 includes the gNB of any of Examples 31 to 32, wherein the anchor channel for U-IoT in the adaptive frequency hopping system is separate from a data channel with frequency hopping in the adaptive frequency hopping system.

Example 34 includes the gNB of any of Examples 31 to 33, wherein the control information for transmission over the anchor channel for U-IoT in the adaptive frequency hopping system includes one or more of: a discovery reference signal (DRS), a physical broadcast channel (PBCH) transmission or essential system information (SI).

Example 35 includes the gNB of any of Examples 31 to 34, wherein the control information includes essential SI that spans over multiple frequency hops, wherein a portion of the essential SI is transmitted over the anchor channel for U-IoT in the adaptive frequency hopping system, and a portion of the essential SI is transmitted over a data channel with frequency hopping in the adaptive frequency hopping system.

Example 36 includes the gNB of any of Examples 31 to 35, wherein the anchor channel for U-IoT in the adaptive frequency hopping system has a shorter dwell time as compared to a data channel for U-IoT in the adaptive frequency hopping system.

Example 37 includes the gNB of any of Examples 31 to 36, wherein the anchor channel for U-IoT in the adaptive frequency hopping system is periodic and occurs at a fixed frequency.

Example 38 includes the gNB of any of Examples 31 to 37, further comprising: means for performing one or more of a CCA or an eCCA on the anchor channel for U-IoT in the adaptive frequency hopping system.

Example 39 includes the gNB of any of Examples 31 to 38, further comprising: means for configuring a random access channel (RACH) procedure for the UE on a system information block (SIB) carried on a data channel with frequency hopping in the adaptive frequency hopping system, wherein a random access response (RAR) window during the RACH procedure extends over multiple frequency hops when the RAR window is larger than a defined dwell time.

Example 40 includes the gNB of any of Examples 31 to 39, further comprising: means for encoding a hopping channel sequence for a non-anchor channel for transmission to the UE over the anchor channel for U-IoT in the adaptive frequency hopping system, wherein the hopping channel sequence is signaled from the gNB to the UE as essential system information (SI).

Example 41 includes a Next Generation NodeB (gNB) operable to communicate over an anchor channel for Unlicensed Internet of Things (U-IoT), the gNB comprising: means for encoding, at the gNB, control information for transmission on two discovery reference signal (DRS) subframes to a user equipment (UE), wherein the control information is transmitted on an anchor channel having a set frequency for U-IoT in an adaptive frequency hopping system, wherein the control information includes: a primary synchronization signal (PSS); a secondary synchronization signal (SSS); a physical broadcast channel (PBCH) transmission; and a system information block for MulteFire bandwidth reduced (SIB-MF-BR).

Example 42 includes the gNB of Example 41, further comprising: means for encoding the control information as a single transmission over the anchor channel to the UE.

Example 43 includes the gNB of any of Examples 41 to 42, wherein: in a first DRS subframe of the two DRS subframes, orthogonal frequency division multiplexing (OFDM) symbol #2 is used for MF-SSS, OFDM symbol #3 is used for MF-PSS, OFDM symbol #5 is used for SSS and OFDM symbol #6 is used for PSS; and in a second DRS subframe of the two DRS subframes, OFDM symbol #2 is used for PSS, OFDM symbol #3 is used for SSS, OFDM symbol #5 is used for MF-PSS and OFDM symbol #6 is used for MF-SSS.

Example 44 includes the gNB of any of Examples 41 to 43, wherein content within the PBCH includes one or more of: a system frame number (SFN) that is indicated using seven bits; a subframe offset within one DRS period; or SIB-MF-BR scheduling information that includes a transport block size (TBS) for the SIB-MF-BR.

Example 45 includes the gNB of any of Examples 41 to 44, wherein content within the SIB-MF-BR includes essential information for a random access channel (RACH) procedure.

Example 46 includes the gNB of any of Examples 41 to 45, wherein a first two orthogonal frequency division multiplexing (OFDM) symbols in a first DRS subframe of the two DRS subframes are reserved for radio frequency (RF) tuning and clear channel assessment (CCA) listen before talk (LBT).

Example 47 includes the gNB of any of Examples 41 to 46, further comprising: means for delaying transmission of the control information for up to one DRS subframe when enhanced clear channel assessment (eCCA) is performed at the gNB.

Example 48 includes the gNB of any of Examples 41 to 47, further comprising: means for using a pseudo random hopping sequence to hop between different data channels, wherein the pseudo random hopping sequence is specific to the gNB.

Example 49 includes the gNB of any of Examples 41 to 48, wherein a dwell time of the anchor channel is less than a dwell time of a data channel used by the gNB, wherein the dwell time of the anchor channel is fixed at 5 milliseconds (ms), and a dwell time of the data channel is fixed at 75 ms.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a base station operable for standalone operation to communicate over an anchor channel in an unlicensed spectrum, bandwidth reduced low complexity and coverage enhancement (BL/CE) cell, the apparatus comprising:
   one or more processors configured to:
     identify, at the base station associated with the BL/CE cell, a system information block (SIB) for bandwidth reduced operation in the unlicensed spectrum;
     encode, at the base station, a master information block (MIB) for bandwidth reduced operation in the unlicensed spectrum for transmission over a broadcast channel to a user equipment (UE), wherein the MIB includes a system frame number (SFN) that is indicated using seven bits, a subframe offset within one discovery reference signal (DRS) period, and SIB scheduling information that includes a transport block size (TBS) for the SIB; and
     encode, at the base station, the SIB for transmission in a downlink over an anchor channel on two DRS subframes to the UE, wherein the SIB is to configure a hopping sequence for the UE, and wherein the anchor channel corresponds to a frequency known to the UE to reduce a cell search period for initial access when the UE is configured for frequency hopping; and
   a memory interface configured to retrieve the SIB from a memory.

2. The apparatus of claim 1, further comprising a transceiver configured to transmit the SIB over the anchor channel to the UE.

3. The apparatus of claim 1, wherein the one or more processors are configured to perform one or more of clear channel assessment (CCA) or an enhanced CCA (eCCA) before transmitting the SIB in the downlink over the anchor channel to the UE.

4. The apparatus of claim 1, wherein 16 frequency hopping channels or 32 frequency hopping channels are supported in the BL/CE cell.

5. The apparatus of claim 1, wherein the one or more processors are configured to use a pseudo random hopping sequence to hop between different channels.

6. A method for a base station operable for standalone operation to communicate over an anchor channel in an unlicensed spectrum, bandwidth reduced low complexity and coverage enhancement (BL/CE) cell, the method comprising:
   identifying, at the base station associated with the BL/CE cell, a system information block (SIB) for bandwidth reduced operation in the unlicensed spectrum;
   encoding, at the base station, a master information block (MIB) for bandwidth reduced operation in the unlicensed spectrum for transmission over a broadcast channel to a user equipment (UE), wherein the MIB includes a system frame number (SFN) that is indicated using seven bits, a subframe offset within one discovery reference signal (DRS) period, and SIB scheduling information that includes a transport block size (TBS) for the SIB; and
   encoding, at the base station, the SIB for transmission in a downlink over an anchor channel on two DRS subframes to the UE, wherein the SIB is to configure a hopping sequence for the UE, and wherein the anchor channel corresponds to a frequency known to the UE to reduce a cell search period for initial access when the UE is configured for frequency hopping.

7. The method of claim 6, further comprising transmitting the SIB over the anchor channel to the UE.

8. The method of claim 6, further comprising performing one or more of clear channel assessment (CCA) or an enhanced CCA (eCCA) before transmitting the SIB in the downlink over the anchor channel to the UE.

9. The method of claim 6, wherein 16 frequency hopping channels or 32 frequency hopping channels are supported in the BL/CE cell.

10. The method of claim 6, further comprising using a pseudo random hopping sequence to hop between different channels.

11. A non-transitory computer-readable storage medium, the computer-readable storage medium including instructions that when executed by a processor of a base station operable for standalone operation to communicate over an anchor channel in an unlicensed spectrum, bandwidth reduced low complexity and coverage enhancement (BL/CE) cell, cause the processor to:
   identify, at the base station associated with the BL/CE cell, a system information block (SIB) for bandwidth reduced operation in the unlicensed spectrum;
   encode, at the base station, a master information block (MIB) for bandwidth reduced operation in the unlicensed spectrum for transmission over a broadcast channel to a user equipment (UE), wherein the MIB includes a system frame number (SFN) that is indicated using seven bits, a subframe offset within one discovery reference signal (DRS) period, and SIB scheduling information that includes a transport block size (TBS) for the SIB; and
   encode, at the base station, the SIB for transmission in a downlink over an anchor channel on two DRS subframes to the UE, wherein the SIB is to configure a hopping sequence for the UE, and wherein the anchor channel corresponds to a frequency known to the UE to reduce a cell search period for initial access when the UE is configured for frequency hopping.

12. The non-transitory computer-readable storage medium of claim 11, wherein the processor is further configured to transmit, using a transceiver, the SIB over the anchor channel to the UE.

13. The non-transitory computer-readable storage medium of claim 11, wherein the processor is further configured to perform one or more of clear channel assessment (CCA) or an enhanced CCA (eCCA) before transmitting the SIB in the downlink over the anchor channel to the UE.

\* \* \* \* \*